United States Patent [19]

Miyaza

[11] Patent Number: 5,678,155
[45] Date of Patent: Oct. 14, 1997

[54] ANTI-COUNTERFEITING DEVICE FOR USE IN AN IMAGE-PROCESSING APPARATUS

[75] Inventor: Masao Miyaza, Tenri, Japan

[73] Assignee: Sharp Kabushiki Kaisha, Osaka, Japan

[21] Appl. No.: 406,533

[22] Filed: Mar. 20, 1995

[30] Foreign Application Priority Data

Mar. 29, 1994 [JP] Japan .................. 6-059326

[51] Int. Cl.[6] ............................................. G03G 21/04
[52] U.S. Cl. ........................ 399/366; 358/296; 382/135
[58] Field of Search ............................. 355/201, 133; 382/135, 165; 358/448, 501, 296

[56] References Cited

U.S. PATENT DOCUMENTS

| | | | |
|---|---|---|---|
| 5,097,517 | 3/1992 | Holt | 382/137 |
| 5,216,724 | 6/1993 | Suzuki et al. | 382/135 |
| 5,321,470 | 6/1994 | Hasuo et al. | 355/201 |
| 5,463,469 | 10/1995 | Funada et al. | 358/296 |
| 5,481,378 | 1/1996 | Sugano et al. | 358/210 |

FOREIGN PATENT DOCUMENTS

| | | |
|---|---|---|
| 0382549 | 8/1990 | European Pat. Off. . |
| 0478351 | 4/1992 | European Pat. Off. . |
| 0488796 | 6/1992 | European Pat. Off. . |
| 0558340 | 9/1993 | European Pat. Off. . |
| 57-85179 | 5/1982 | Japan . |
| 4-205272 | 7/1992 | Japan . |
| 6-701153 | 3/1994 | Japan .................. 355/201 |
| 0275387 | 2/1994 | United Kingdom . |
| WO 94/03998 | 2/1994 | WIPO . |

*Primary Examiner*—Joan H. Pendegrass

[57] ABSTRACT

A character-detecting section detects characters from an image that has been read from a document. In order to allow a character-recognizing section to make a judgement as to whether or not the character is identical to any character of specific documents such as paper money and securities stored in a RAM, a discrimination-level setting section generates discrimination patterns corresponding to the discrimination level, and supplies them to the character-recognizing section. As a result of the judgement based on the discrimination at a low level, if the document is judged as one of the specific documents, a specific-document judging section controls the discrimination-level setting section in order to allow the character-recognizing section to make a re-judgement for identification. Thus, the discrimination-level setting section supplies discrimination patterns at a higher level to the character-recognizing section. This arrangement makes it possible to shorten the processing time that is required for discrimination as to whether or not the document in question is any of the specific documents, as well as making it possible to ensure the reliability of discrimination.

19 Claims, 27 Drawing Sheets

ANTI-COUNTERFEITING DEVICE FOR USE IN AN IMAGE-PROCESSING APPARATUS

FIELD OF THE INVENTION

The present invention relates to an anti-counterfeiting device that is capable of preventing paper money or other articles from being counterfeited and which is installed in image-processing apparatuses that release an image read out from a document, such as digital copying machines, facsimiles, and scanners.

BACKGROUND OF THE INVENTION

In recent years, electrophotographic apparatuses have been developed to such a degree that multi-color documents can be copied almost perfectly; consequently, it is necessary to provide a method for preventing items, such as paper money and securities, from being counterfeited. In this connection, for example, a method which is disclosed in Japanese Laid-Open Patent Publication No. 205272/1992 (Tokukaihei 4-205272) is listed as one of the prior-art anti-counterfeit methods. In this Patent Publication, an anti-counterfeiting device is disclosed, which is applied to a digital copying machine wherein an image, which has been read from a document by using a scanner, is temporarily stored in a memory, and upon copying, the image is read from the memory and released. In the anti-counterfeit processing, a judgement is made as to what degree a document to be copied is similar to relevant image data of any specific document that has been preliminarily stored, and in accordance with the degree of similarity, processing conditions of masking and UCR for the output image are altered.

In the prior-art anti-counterfeiting device for the digital copying machine, however, the selection is made between the two, that is, a counterfeit article and a genuine article, in its discrimination method; this might cause an erroneous discrimination between counterfeit and genuineness in the case of an image that is at the edge of its discrimination level. For example, if a document, which is not a specific document, is erroneously discriminated as a specific document, complaints might be raised from the user, and the reliability of the device might be impaired.

Further, in the above-mentioned anti-counterfeiting device, if its discrimination level is increased, device cost and processing time increase. Moreover, the device has a contradictory problem in that if the discrimination level is decreased, the possibility of erroneous discrimination increases, and if the discrimination level is increased, the processing time increases.

SUMMARY OF THE INVENTION

The objective of the present invention is to provide an image processing apparatus having an anti-counterfeiting device that is capable of shortening a discrimination-process time of a specific document as well as ensuring the reliability of the device while maintaining the accuracy of the discrimination.

In order to achieve the above-mentioned objective, the anti-counterfeiting device of the present invention, which is installed in an image processing apparatus having a reading for reading an image from a document and an output circuit for releasing an output image derived from the read image, is provided with:

(1) a character detector for detecting a character from the image that has been read from the document by the reader;

(2) a discrimination-pattern storage for storing specific images each of which is one portion of an image of paper money;

(3) a discrimination-pattern supplier for generating discrimination patterns corresponding to a discrimination level from the specific images stored in the discrimination-pattern storage;

(4) a judger for making a judgement as to whether or not the document is paper money by comparing the detected character with the discrimination patterns;

(5) a discrimination controller which first controls the judger so that the judger makes a judgement as to whether or not the document is paper money by using discrimination patterns at a predetermined level; if the judgement shows that the document is paper money, then controls the discrimination-pattern supplier so that the discrimination-pattern supplier supplies discrimination patterns at a level higher than the level of said discrimination patterns; and controls the judger so that the judger makes re-judgement so as to confirm whether or not the document is paper money by using the discrimination patterns; and (6) an output controller which, if the judger confirms that the document is paper money, controls the output circuit so as to stop the output of the output image.

With the above-mentioned arrangement, the character-detector detects a character from an image of a document, and the character is compared with specific images each of which is one portion of an image of paper money. As a result, if the document is Judged as paper money, a re-judgement is made so as to confirm whether or not the document is paper money by using discrimination patterns at a higher level. If the document is confirmed as such, the output controller stops the output of the output image.

In this arrangement, two judgement-making steps are made: the first judgement is made by using discrimination patterns at a comparatively lower level, and only in the case where a document appears to be paper money, the second judgement is made based on a higher-level examination. This reduces the possibility of misjudgement that a document, which is not paper money, is Judged as paper money, thereby improving the reliability of the anti-counterfeiting device. Further, different from the conventional method wherein a document is compared with the entire portion of paper money, the above-mentioned control operation restricts the object for reference of judgement to one portion on paper money. This makes it possible to simplify the judgement and reduce the burden that is imposed during judgement, thereby reducing the judging time.

Moreover, the above-mentioned arrangement may further include a face-value discriminator which controls the discrimination-pattern supplier so that if the character detected by the character detector means is identical to a face value of paper money, it supplies discrimination patterns at a higher level in accordance with the increment of the face value. This arrangement ensures a more positive judgement by upgrading the accuracy of the discrimination in accordance with the increment of the face value; therefore, it becomes possible to prevent paper money with high face values from being counterfeited.

Furthermore, the above-mentioned arrangement may also include another feature which, if the character detected by the character detector is identical to a face value of paper money, supplies the image judger with discrimination patterns at a higher level in accordance with the increment of the number of output copies that has been entered by the operator through an output-copy-number inputter this makes it possible to prevent paper money from being counterfeited in a large amount.

In addition, the anti-counterfeiting device of the present invention, which is installed in an image processing apparatus having a reader for reading an image from a document and an output circuit for releasing an output image derived from the read image, is provided with:

(1) a self detector for detecting a seal from the image that has been read from the document by the reader;

(2) a seal storage means for preliminarily storing specific seals that are put or printed on specific documents;

(3) a discrimination-pattern supplier for generating discrimination patterns in accordance with a discrimination level, the discrimination patterns being derived from the specific seals stored in the seal storing means;

(4) a judger for making a judgement as to whether or not the document is any of the specific documents by comparing the seal detected by the seal detector with the discrimination patterns derived from the specific seals;

(5) a discrimination controller means which first controls the discrimination-pattern supplier so that it generates the outer shapes of the specific stamps as discrimination patterns; allows the judger to make a judgement as to whether or not the document is any of the specific documents; if the judgement shows that the document is one of the specific documents, then controls the discrimination-pattern supplier so that the discrimination-pattern supplier supplies discrimination patterns at a level higher than the level of said discrimination patterns; and controls the judger so that the judger makes a re-judgement so as to confirm whether or not the document is one of the specific documents by using the discrimination patterns; and (6) an output controller which, if the judger confirms that the document is one of the specific documents, controls the output circuit so as to stop the output of the output image.

In this arrangement, it is possible to make a judgement as to whether or not a document is any of the specific documents based on the seals that are put or printed on the specific documents. In other words, two judgement-making steps are made in the same manner as the aforementioned arrangement: the first judgement is made as to whether or not there is a specific seal on the document based on the outer shapes of the specific seals that are provided as discrimination patterns at a lower level, and only in the case where there is a specific seal on the document, the second judgement is made as to whether or not the seal on the document is any of the specific seals based on a higher-level examination. This arrangement prevents the possibility of misjudgement that a document, which is not a specific document, is judged as one of the specific documents, while maintaining the accuracy of the discrimination. Further, different from the conventional method wherein an entire portion of a document is used for comparison, only a seal portion of a document is used for making a judgement; this makes it possible to reduce the time and burden that are required for the judging process.

Also, the anti-counterfeiting device of the present invention, which is installed in an image processing apparatus having a reader for reading an image from a document and an output circuit for releasing an output image derived from the read image, is provided with:

(1) a seal storage for preliminarily storing images of specific seals that are put or printed on specific documents;

(2) a seal detector for detecting a seal from the image that has been read from the document by the reader and for making a judgement as to the degree of importance of the seal based on the style of a character contained in the seal;

(3) a discrimination-pattern supplier for generating discrimination patterns in accordance with a discrimination level, the discrimination patterns being derived from the images of the specific seals stored in the seal storage;

(4) a judger for making a judgement as to whether or not the document is one of the specific documents by comparing the seal with the discrimination patterns;

(5) a discrimination controller which, if a seal is detected by the seal detector, first controls the discrimination-pattern supplier so that it generates discrimination patterns that are suitable for the degree of importance of the seal, and controls the judger so that the judger makes a judgement as to whether or not the document is one of the specific documents by comparing the seal with the discrimination patterns; and (6) an controller means which, if the judger confirms that the document is one of the specific documents, controls the output circuit so that the output of the output image is stopped.

With the above-mentioned arrangement, the seal detector makes a judgement as to the degree of importance of the seal based on the style of a character contained in the seal that has been detected from the image of a document. The discrimination-pattern supplier generates discrimination patterns in accordance with the degree of importance of the seal, and the judger makes a judgement as to whether or not the document is one of the specific documents by comparing the seal with the discrimination patterns. Normally, specific documents having high degree of importance have seals having high degree of importance put or printed on them; therefore, this detection of seals makes it possible to effectively recognize specific documents. As a result, it becomes possible to effectively prevent specific documents from being counterfeited. Since the judgement is made based only on the seal portion that is one portion of the document, the judging operation is simplified and the burden that is imposed during judgement is reduced, thereby reducing the judging time.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIGS. 1 through 13, the following description will discuss one embodiment of the present invention.

Figure 2:
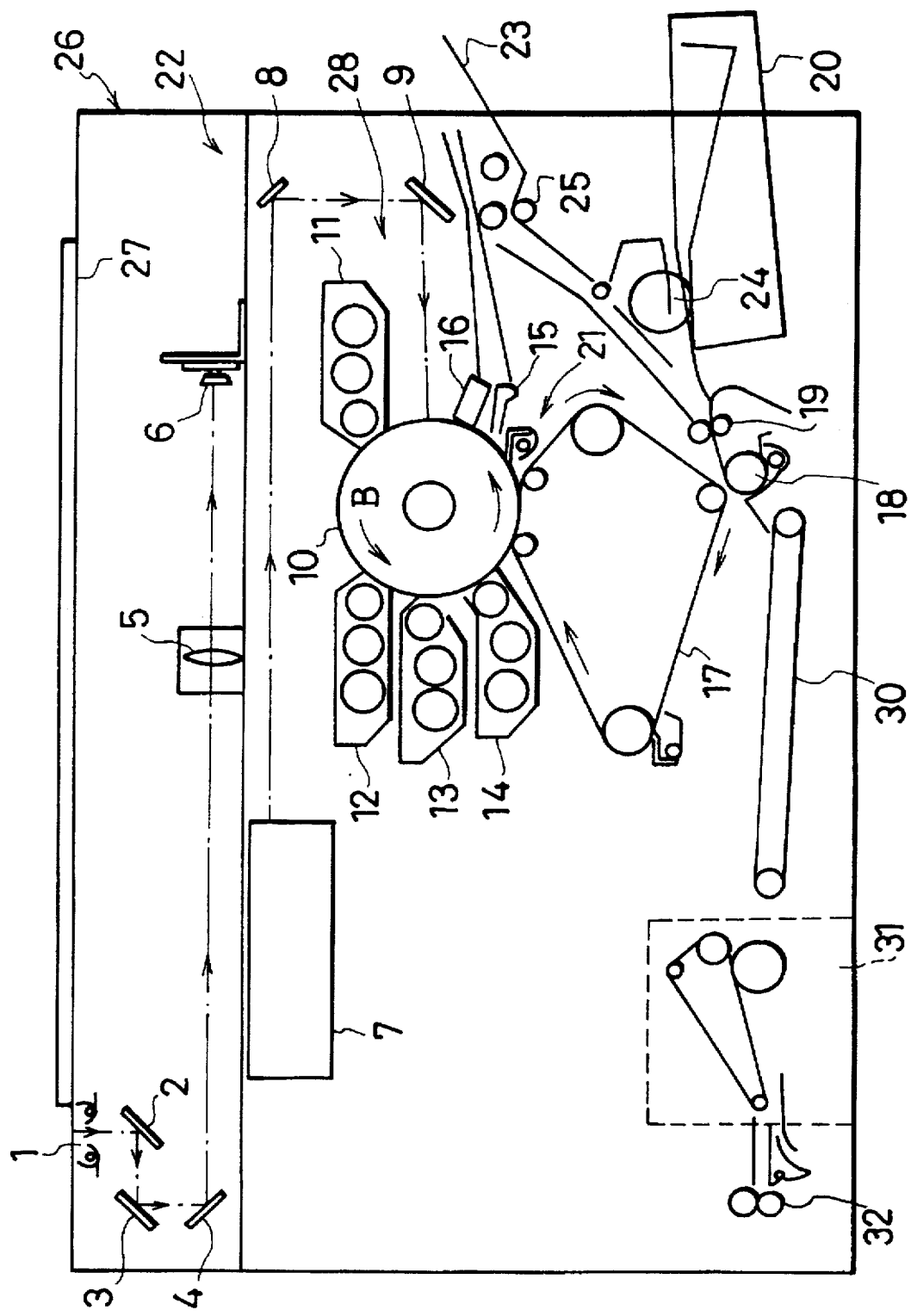
FIG. 2 is a front view showing the structure of the digital copying machine.

As illustrated in FIG. 2, a digital copying machine, which is an image-processing apparatus to which the present embodiment is applied, is provided with a document platen 27 made of hard transparent glass that is installed on the upper portion of a copying machine main body 26.

Below the document platen 27, are installed a scanner 22 that is constituted of a lamp unit 1, mirrors 2, 3 and 4, a lens unit 5, a CCD (Charge Coupled Device) sensor 6, and other members. In the scanner 22, a document (not shown) placed on the document platen 27 is illuminated by the lamp unit 1, and the reflected light is directed to the light-receiving face of the CCD sensor 6 through the mirrors 2, 3 and 4 and the lens unit 5, thereby allowing its image to be read as electric signals.

Below the scanner 22, is installed a laser driver unit 7. The document data, which has been read by the CCD sensor 6, is subjected to image processings for copying in an image-processing section, not shown, and is sent to a laser driver unit 7 as output image data. The laser driver unit 7 projects laser light from, for example, a semiconductor laser installed therein in accordance with the inputted document data.

The laser light, released from the laser driver unit 7, is reflected by mirrors 8 and 9 that are disposed in its light path, and is projected onto a photoreceptor drum 10 that rotates in the direction of arrow B, thereby forming an electrostatic latent image on the photoreceptor drum 10. On the periphery of the photoreceptor drum 10, is disposed a main charger 16 for uniformly charging the surface of the photoreceptor drum 10 to a predetermined electric potential prior to the exposure made by the laser light. Moreover, in the rotating direction of the photoreceptor drum 10 from the main charger 16, are disposed the following and other devices in this order: a developing device 28 for developing the electrostatic latent image on the photoreceptor drum 10 by supplying toner thereonto, a transferring belt 17 whereon the toner image is temporarily transferred from the photoreceptor drum 10, a cleaning device 21 for collecting residual toner from the surface of the photoreceptor drum 10, and a charge-eliminating lamp 15 for eliminating residual electric potential from the photoreceptor drum 10 prior to the next charging operation.

The developing device 28 includes a black-developer tank 11, a yellow-developer tank 12, a magenta-developer tank 13 and a cyan-developer tank 14, and each of the developer tanks 11 through 14 contains toner of the corresponding color. The transferring belt 17, which is an endless belt, is installed so as to freely move in the direction of the arrow, and one portion thereof is pressed onto the photoreceptor drum 10, thereby allowing the toner image of the photoreceptor drum 10 to be transferred thereon.

Further, on the paper-feeding side of the transferring belt 17, are disposed a register roller 19 for supplying sheets of paper to the transferring belt 17 with predetermined intervals, a paper-feed cassette 20 and a manual paper-feed section 23. A paper-feed roller 24 for transporting sheets of paper, a transport roller 25 and other members are disposed in the vicinity of the paper-feed cassette 20 and the manual paper-feed section 23. Below the transferring belt 17, is installed a transferring roller 18 which presses a sheet of paper transferred from the register roller 19 onto the transferring belt 17 so that the toner image on the transferring belt 17 is transferred onto the sheet of paper.

On the paper-discharging side of the transferring belt 17, are disposed a conveyer belt 30 for carrying the sheet of paper that has been subjected to the toner-image transferring operation, a fixing device 31 for fixing the toner image onto a sheet of paper by heat, and a discharge roller 32 for discharging the sheet of paper having been subjected to the fixing process out of the machine.

In the above-mentioned arrangement, a color copying operation (3-color copying) is carried out in the following sequence. After the main charger 16 has uniformly charged the surface of the photoreceptor drum 10, the scanner 22 conducts the first scanning operation. Thus, respective data of the red component (R), green component (G) and blue component (B) of a document are read by the CCD sensor 6, and in accordance with the respective data, yellow data is first created in the image-processing section. A laser light, which is modulated based on the yellow data, is released from the laser driver unit 7, and the laser light exposes the surface of the photoreceptor drum 10, thereby forming a yellow electrostatic latent image at the exposed portion. Successively, yellow toner is supplied from the yellow-developer tank 12 to the electrostatic latent image formed in the image area, and a toner image having the corresponding color is thus formed.

Next, the yellow toner image is transferred onto the transferring belt 17 that is being pressed onto the photoreceptor drum 10. At this time, although some toner that has not been consumed during the transferring process still exists on the surface of the photoreceptor drum 10, the cleaning device 21 scrapes the residual toner from the surface. Further, the static-eliminating lamp 15 eliminates residual electric charge from the surface of the photoreceptor drum 10.

After completion of the above-mentioned processes, the main charger 16 uniformly charges the surface of the photoreceptor drum 10 again, and the scanner 22 conducts the second scanning operation. Magenta data is created in the image-processing section in accordance with the resulting document data. A laser light, which is modulated based on the magenta data, is projected from the laser driver unit 7 onto the photoreceptor drum 10, thereby forming a magenta electrostatic latent image. Successively, magenta toner is supplied from the magenta-developer tank 13 to the electrostatic latent image, and a toner image having the corresponding color is thus formed on the photoreceptor drum 10. Then, the magenta toner image is transferred onto the transferring belt 17 so as to be superimposed onto the yellow toner image formed thereon.

After completion of the same processes as described earlier made by the cleaning device 21 and the static-eliminating lamp 15, the main charger 16 uniformly charges the surface of the photoreceptor drum 10 again, and the scanner 22 conducts the third scanning operation. A laser light, which is modulated based on the cyan data, is projected onto the photoreceptor drum 10, thereby forming a cyan electrostatic latent image thereon. Successively, cyan toner is supplied from the cyan-developer tank 14 to the electrostatic latent image, and a toner image having the corresponding color is thus formed on the photoreceptor drum 10. Then, the cyan toner image is transferred onto the magenta toner image formed on the transferring belt 17, thereby completing a final image-superimposing process.

Thereafter, the resulting toner image, which has been subjected to the image-superimposing process on the transferring belt 17, is transferred onto a sheet of paper by the transferring roller 18, and after the toner image is fixed thereon by heat in the fixing device 31, the sheet of paper is ejected out of the machine by the discharge roller 32.

Here, the above-mentioned processes are processes for 3-color copying; and in the case of 4-color copying, another process, which uses black toner stored in the black-developer tank 11, is added to the above-mentioned processes. In contrast, in the case of mono-color copying, only the black toner is supplied from the black-developer tank 11 onto an electrostatic latent image on the photoreceptor drum 10, and the resulting toner image is transferred onto a sheet of paper through the transferring belt 17.

Figure 1:
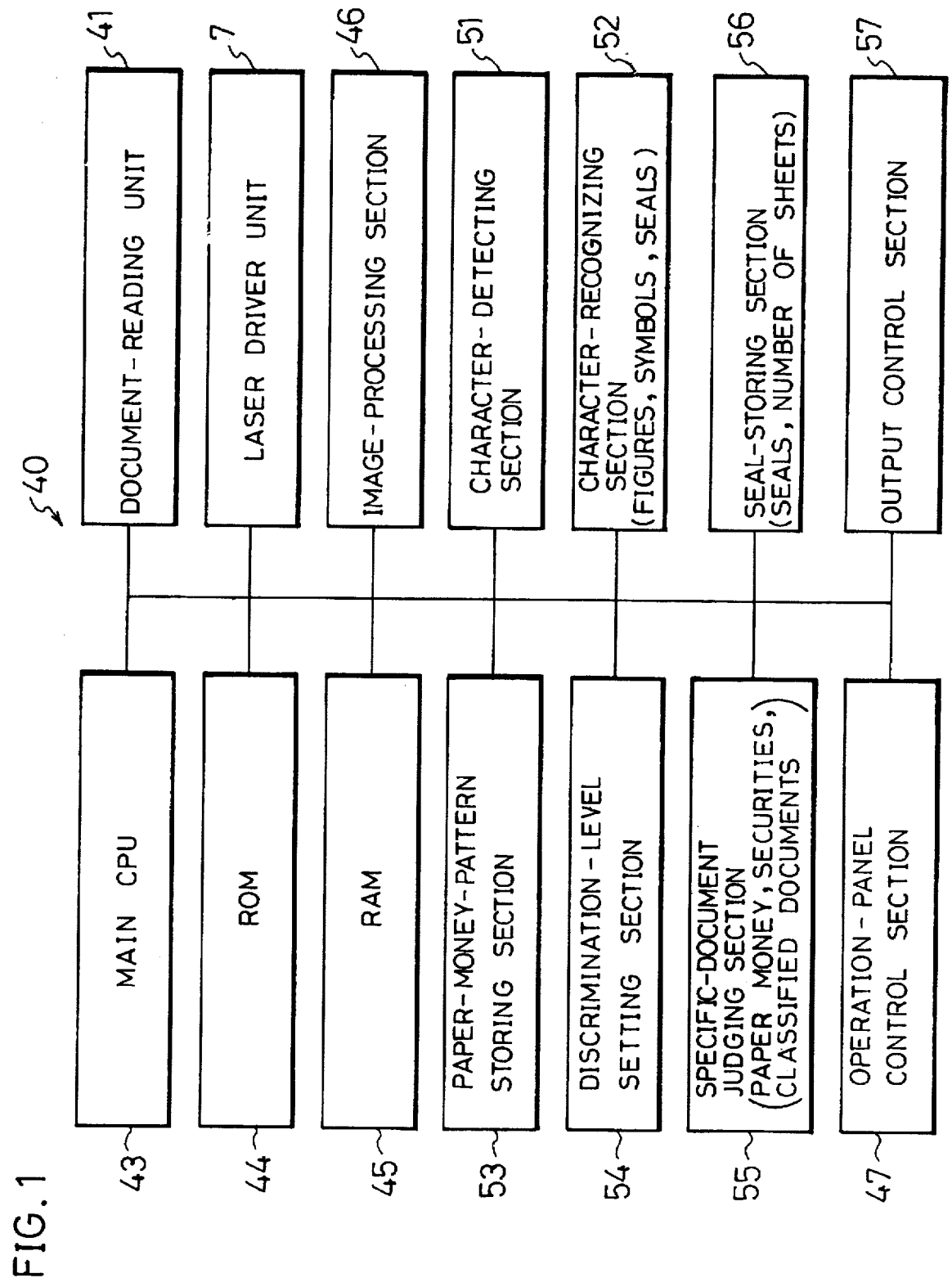
FIG. 1 is a block diagram showing an arrangement of an image-processing control section that is installed in an anti-counterfeiting device in one embodiment of the present invention for use in a digital copying machine.

Moreover, the digital copying machine of the present embodiment is provided with an image-processing control section 40 that is shown in FIG. 1. In the image-processing control section 40, a plurality of control sections, such as a document-reading unit 41 and the laser driver unit 7, are controlled by a main CPU (Central Processing Unit) 43. Here, a ROM (Read Only Memory) 44 provides areas for storing control programs, and a RAM (Random Access Memory) 45 is used as areas for storing the inherent parameters of a copying machine and working areas for executing the programs. In the present embodiment, the RAM 45 not only has a function for temporarily storing images read from documents, but also stores figures such as face values in paper money, symbols like YEN, ¥, $, etc., and logos, seals, etc. that are printed on paper money and other articles with inherent designs, as will be described later.

Figure 3:
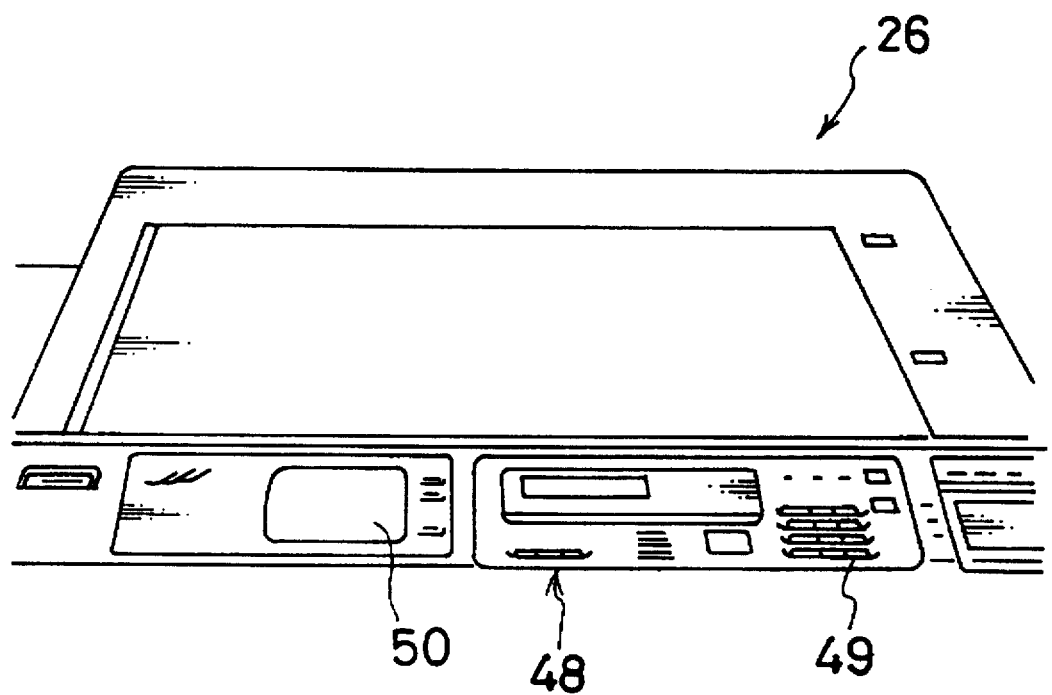
FIG. 3 is an explanatory drawing of an operation panel that is installed in the digital copying machine.

As described earlier, the document-reading unit 41 reads an image from a document that is placed on the document platen 27. The document image thus read is subjected to image processings in the image-processing section 46, wherein, for example, changes in image density and copy magnification are made in accordance with desires of the user. The inputted image, thus processed in the image-processing section 46, is sent to the laser driver unit 7, and is released as laser light that is modulated by the document image. FIG. 3 shows an operation-panel control section 47 for controlling an operation panel 48 that is installed on the upper face of the copying-machine main body 26. The operation panel 48 is provided with: ten keys 49 that are used for entering the number of copies, pass-numbers, and other numbers; a liquid-crystal display panel 50 for displaying the number of copies, messages for the operator, etc.; and other members.

Moreover, as shown in FIG. 1, the digital copying machine of the present embodiment is provided with the following sections that collectively function as an anti-counterfeiting device: a character-detecting section 51 functioning as a character detector; a character-recognizing section 52 functioning as a judger; a paper-money-pattern storing section 53; a discrimination-level setting section 54 functioning as a discrimination-pattern supplier a specific-document judging section 55; a seal-storing section 56; an output control section 57, etc.

The character-detecting section 51 selectively detects various characters, such as figures, symbols and seals, from the document image that has been processed by the image-processing section 46. The character-recognizing section 52 makes a judgement as to whether or not a character detected by the character-detecting section 51 is identical to any specific image that has been preliminarily stored in the RAM 45. Here, the specific images include figures such as face values in paper money, symbols like YEN, ¥, $, etc., and logos, seals, etc. that are inherent to paper money and other articles.

The paper-money-pattern storing section 53 stores a plurality of kinds of discrimination levels that are used by the specific-document judging section 55 so as to judge whether or not the document in question is identical to any specific document. When the character-recognizing section 52 carries out its judgement, the discrimination-level setting section 54 selectively reads out a discrimination pattern corresponding to the discrimination level in question from the discrimination patterns stored in the paper-money-pattern storing section 53, and supplies it to the character-recognizing section 52.

When the character-recognizing section 52 has made a judgement that a character on a document is identical to any character on paper money or other articles by using a discrimination pattern at a lower level, the specific-document judging section 55 controls the discrimination-level setting section 54 so as to supply to the character-recognizing section 52 discrimination patterns at a higher level. As will be described later, the character-recognizing section 52 makes a re-judgement as to the identification by using the discrimination patterns at the higher level.

Moreover, the specific-document judging section 55 also has a function which, in the case when the character detected from the document is a face value of paper money, controls the discrimination-level setting section 54 so as to supply the character-recognizing section 52 with discrimination patterns that are suitable for the face value. For example, the discrimination-level setting section 54 is controlled by the specific-document judging section 55 so that the higher the face value, the higher level of discrimination patterns is supplied to the character-recognizing section 52.

Furthermore, the specific-document judging section 55 also has a function as an output-copy-number discriminator so that it controls the discrimination-level setting section 54 to supply the character-recognizing section 52 with discrimination patterns at a higher level in accordance with the increment of the number of output copies in relation to the number of output copies of a copied image that is specified by the user.

The seal-storing section 56, which stores images of various seals that are used in securities, classified documents and other documents, is also capable of storing the permissible number of copies for each of the various seals, as will be described later.

Moreover, the output control section 57 controls output operations such as the stopping operation for the copying operation when the judgement is made that the document is one of the specific documents.

Referring to FIGS. 4 through 13, the following description will discuss respective controlling operations for anti-counterfeit in a digital copying machine that is provided with the above-mentioned arrangement.

Figure 4:
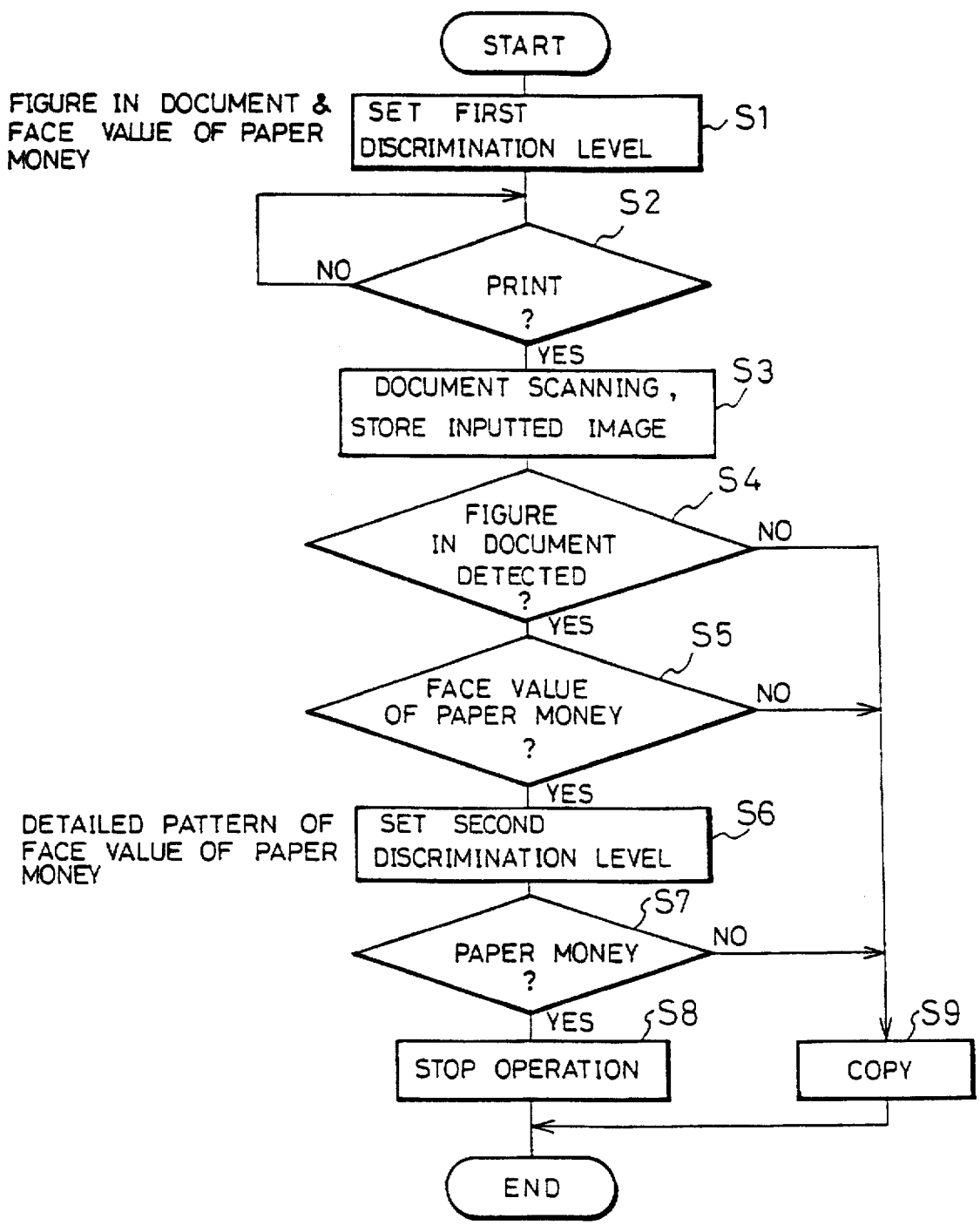
FIG. 4 is a flow chart showing a controlling operation that is carried out so as to prevent counterfeiting by detecting figures in paper money in the anti-counterfeiting device of the present invention for use in the digital copying machine.

First, referring to a flow chart, shown in FIG. 4, as well as FIG. 5, an explanation will be given on a controlling operation wherein: if a figure in characters detected from a document is identical to any figure corresponding to a face value in paper money, a judgement is made as to whether or not the document is paper money after increasing the level of discrimination; and if the judgement is made as such, a warning is given and the copying operation is stopped.

Figure 5:
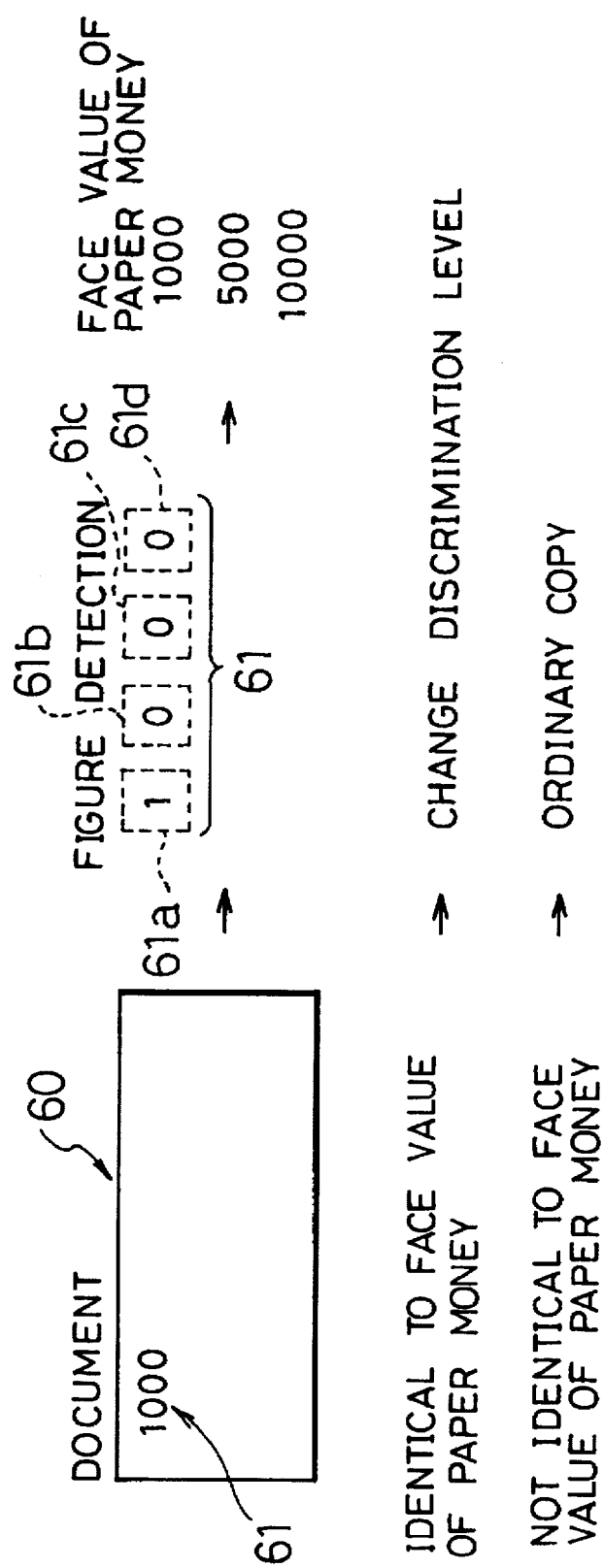
FIG. 5 is an explanatory drawing that shows an outline of the controlling operation shown in FIG. 4.

Now, suppose that a document 60, which contains a figure portion 61 of the printed figure "1000" as shown in FIG. 5, is placed on the apparatus. First, in order to make a judgement as to whether or not the figure printed on the document 60 is identical to any face value in paper money, such as 1000, 5000, or 10000 in the case of yen paper money, the first discrimination level, which is a lower level in discrimination patterns, is set by the specific-document judging section 55 (S1). Thus, discrimination patterns corresponding to the first discrimination level are supplied to the character-recognizing section 52 by the discrimination-level setting section 54.

Here, as will be described later, the first discrimination level corresponds to discrimination patterns in a lower level that are commonly used in a judgement as to whether or not a symbol used in a document is identical to any symbol of unit, such as ¥ or $, used in paper money as well as in a judgement as to whether or not a seal used in a document is identical to any seal in paper money. The first discrimination level is used for making a comparison, for example, in the level of binary-coded images.

Next, when the number of output copies is entered through ten keys 49 installed on the operation panel 48 shown in FIG. 3, if necessary, and a print key, not shown, is depressed (S2), the scanner 22 scans the document 60, and the document image is stored in the RAM 45 (S3).

Successively, the character-detecting section 51 detects a character from the document image stored in the RAM 45, and further examines the character as to whether or not it is a figure (S4). As for this detection as to whether or not the document image contains any figure, it is possible to apply a method of extracting features of characters as well as a method of using character recognition.

More specifically, the character-detecting section 51 carries out the following processings in order to make the character-recognition more efficiently, prior to recognizing characters. For example, shadow portions are erased by using the binary-coding processing of an image; void characters are detected based on the background and character balance of the binary-coded image data; and in the case of void characters, the black-white reversing process is carried out. Thus, these processings make it possible to convert document images into images that are processed more easily. In addition, characters are simplified by the line-narrowing process, extraction of connecting components and other processes.

Thereafter, the inputted image is separated into connected graphic units by using features, such as "having a small character", "having an isolated character" and "having aligned characters", and a judgement is made as to whether or not the graphic form is identical to any character size. Then, the separated graphic units are compared with figure patterns, thereby detecting characters.

By using the above-mentioned methods, the figure portion 61 in the document 60 is divided into graphic units 61a through 61d as indicated by portions enclosed by broken lines in FIG. 5. Further, by comparing these with figure patterns, the graphic unit 61a is detected as "1" as a character, and the graphic units 61b through 61d are detected as "0" as a character.

If a figure is detected at S4 in the manner as described above, a judgement is made as to whether or not the figure is identical to any face value of paper money, by comparing the image of the figure portion 61 with the discrimination patterns (S5). If the judgement shows that the figure is identical to a face value of paper money at S5, the specific-document judging section 55 selects the second discrimination level, which is a level higher than the first discrimination level in discrimination patterns, and controls the discrimination-level setting section 54 so that the discrimination-level setting section 54 reads the discrimination pattern corresponding to the second discrimination level from the paper-money- pattern storing section 53 and supplies them to the character-recognizing section 52 (S6). Here, the discrimination patterns corresponding to the second discrimination level are, for example, discrimination patterns that are used for comparing a document with an image of paper money by using image data represented by multi-gradation.

Then, the character-recognizing section 52 again makes a judgement as to whether or not the image of the figure in the inputted document is identical to the image of the figure in the face value of paper money by using the discrimination patterns corresponding to the second discrimination level (S7). If the judgement shows that the image of the figure in the inputted document is identical to the image of the figure in the face value of paper money, a warning display is given on the liquid crystal display panel 50 in the operation panel 48 through a control operation of an operation panel control section 47, and the copying operation of the copying machine main body 26 is stopped (S8) by the controlling operation of the output control section 57.

Moreover, if the judgement is "NO" at S4, S5 and S7, it is determined that the character in question is neither a figure, nor a face value of paper money, and that the document in question is not paper money; therefore, the ordinary copying operation is carried out (S9).

As described above, a figure is detected as a character from an image of a document, and if the figure is identical to any face value of paper money, a re-judgement is made by upgrading the level of discrimination and using discrimination patterns that allow the image of the figure in the document to be examined in more detail. This arrangement makes it possible to improve the reliability of the judgement as to, whether or not the document in question is paper money. In other words, two judgement-making steps are made: the first judgement is made by using discrimination patterns at a lower level, and only in the case where a document appears to be paper money, the second judgement is made based on a higher-level examination. Therefore, this reduces the possibility of misjudgement that a document, which is not paper money, is judged as paper money, thereby improving the reliability of the anti-counterfeiting device.

Different from the conventional method wherein a document is compared with the entire portion of paper money, the above-mentioned control operation restricts the object for reference of judgement to character portions on paper money. This makes it possible to simplify the judgement and reduce the burden that is imposed during judgement, thereby reducing the judging time.

Next, referring to a flow chart, shown in FIG. 6, as well as FIG. 7, an explanation will be given on a controlling operation wherein: a figure is detected as a character from an image of a document; if the figure is identical to any face value in paper money, a judgement is made as to whether or not the document is paper money after increasing the level of discrimination in accordance with the increment of the face value; and if the judgement is made as such, a warning is given and the copying operation is stopped. In this case also, it is supposed that a document 60, which contains a figure portion 61 of the printed figure "1000" as shown in FIG. 7, is placed on the apparatus. Here, this controlling operation is obtained by replacing S6 in the flow chart of FIG. 4 with S10 which will be discussed later.

Figure 6:
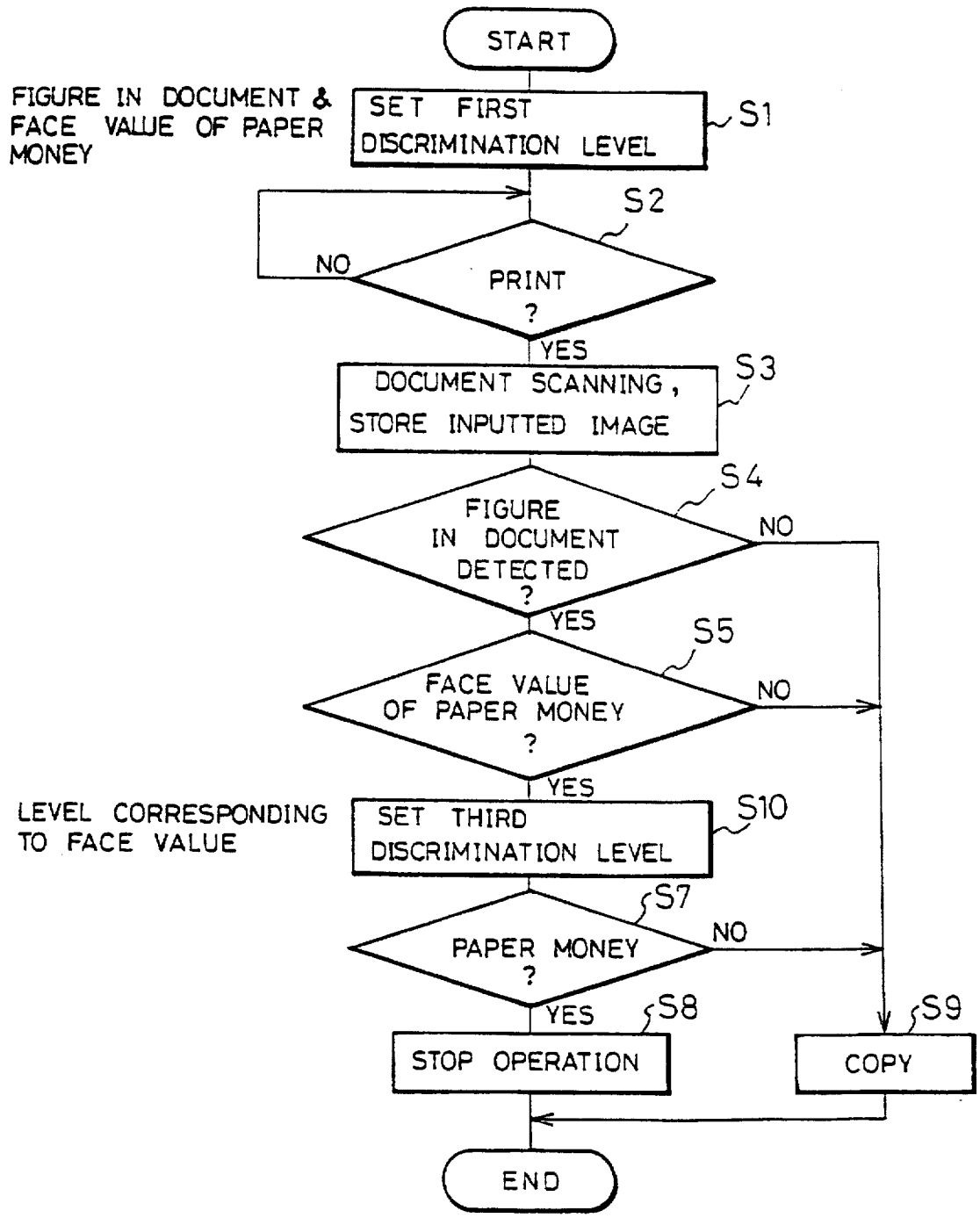
FIG. 6 is a flow chart showing a controlling operation that is carried out so as to prevent counterfeiting in relation to face values of paper money in the anti-counterfeiting device of the present invention for use in the digital copying machine.
Figure 7:
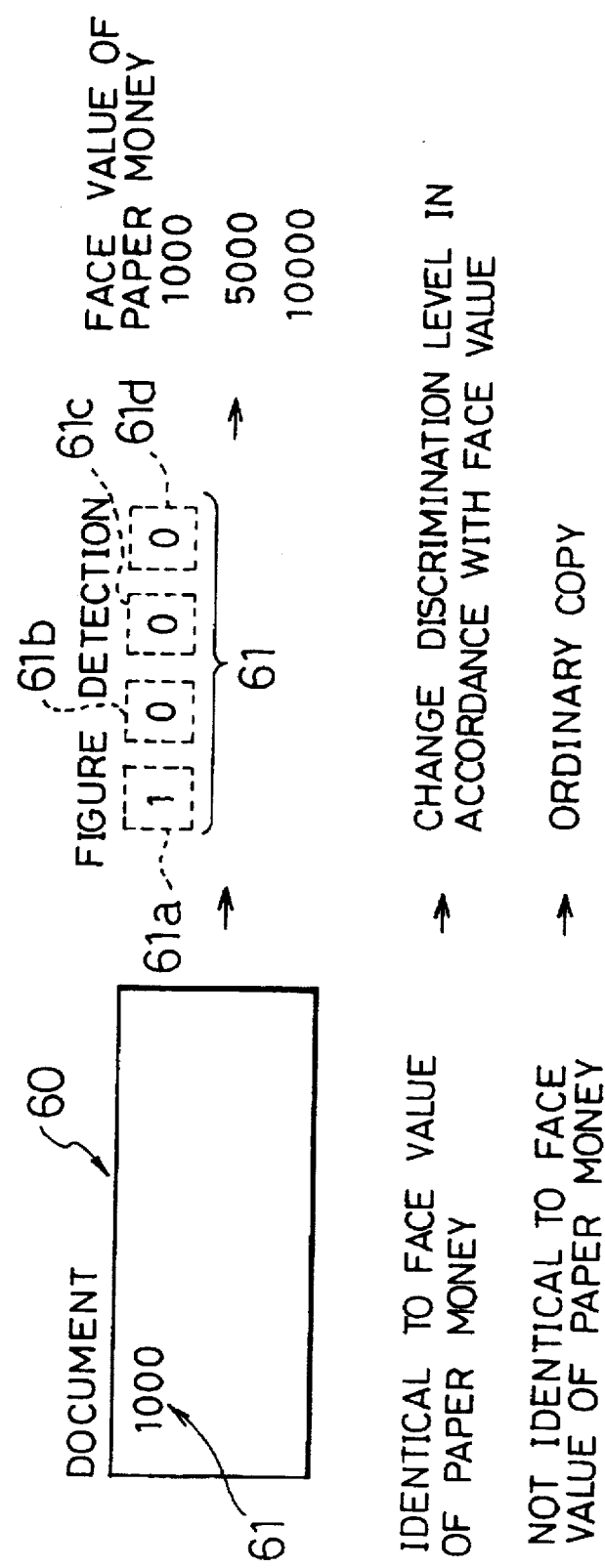
FIG. 7 is an explanatory drawing that shows an outline of the controlling operation shown in FIG. 6.

If a figure "1000" is detected from the figure portion 61 of the document 60 at S4 shown in FIG. 6 in a manner as described above, a judgement is made as to whether or not the figure is identical to any face value of paper money (S5).

If the judgement shows that the figure is identical to a face value of paper money at S5, the specific-document judging section 55 sets a discrimination level that is suitable for the face value in question as the third discrimination level, and controls the discrimination-level setting section 54 so that it supplies the discrimination patterns corresponding to the third discrimination level to the character-recognizing section 52 (S10). For example, if the figure is 1000, the discrimination level for making a comparison based on binary-coded images is set as the third discrimination level; if the figure is 5000, the discrimination level for making a comparison based on black-and-white, multi-gradation images is set as such; and if the figure is 10000, the discrimination level for making a comparison based on full-color images is set as such.

Additionally, another setting method for the discrimination level may be adopted, wherein the document image is divided into blocks and the number of the divisions is changed in order to make a more detailed discrimination in accordance with the increment of the face value.

Then, a judgement is made again as to whether or not the figure in the document is identical to the figure in the face value of paper money by using the third discrimination level that is set in accordance with the face value (S7). In the same manner as shown in FIG. 4, if the judgement shows that it is identical to the figure in the face value of paper money, a warning display is given on the liquid crystal display panel 50 in the operation panel 48 through the controlling operation of the operation panel control section 47, and the copying operation of the copying machine main body 26 is stopped (S8) through the controlling operation of the output control section 57. Moreover, if the judgement is "NO" at S4, S5 and S7, it is determined that the character in question is neither a figure, nor a face value of paper money, and that the document in question is not paper money; therefore, the ordinary copying operation is carried out (S9).

As described above, a figure is detected as a character from an image of a document, and if the figure is identical to any face value of paper money, a re-judgement is made by upgrading the level of discrimination in accordance with the increment of the face value and using discrimination patterns that allow the image of the figure in the document to be examined in more detail. In addition to the aforementioned effects, this arrangement makes it possible to prevent paper money with high face values from being counterfeited and to reduce the possibility of losses due to paper-money counterfeit.

Figure 8:
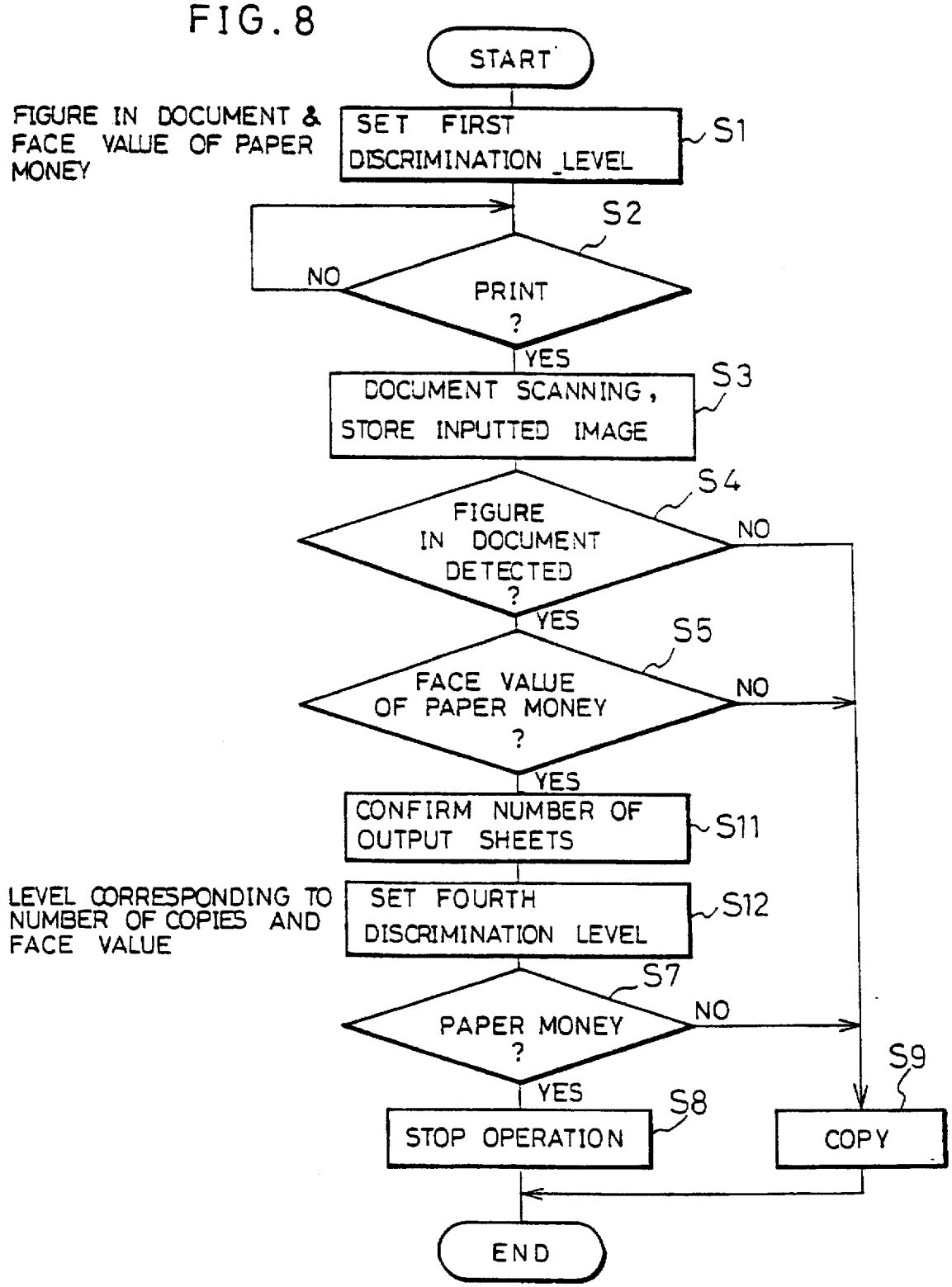
FIG. 8 is a flow chart showing a controlling operation that is carried out so as to prevent counterfeiting in relation to face values of paper money and the number of output copies in the anti-counterfeiting device of the present invention for use in the digital copying machine.

Next, referring to a flow chart, shown in FIG. 8, as well as FIG. 9, an explanation will be given on a controlling operation wherein: a figure is detected as a character in a document; if the figure is identical to any face value in paper money, a judgement is made as to whether or not the document is paper money after upgrading the level of discrimination in accordance with the face value and the increment of the number of output copies that is specified by the user as output copy number; and if the judgement is made as such, a warning is given and the copying operation is stopped. Here, in this controlling operation, only S6 and the steps thereafter are changed from the sequence of the flow chart shown in FIG. 4. In this case also, it is supposed that a document 60, Which contains a figure portion 61 as shown in FIG. 9, is placed on the apparatus.

Figure 9:
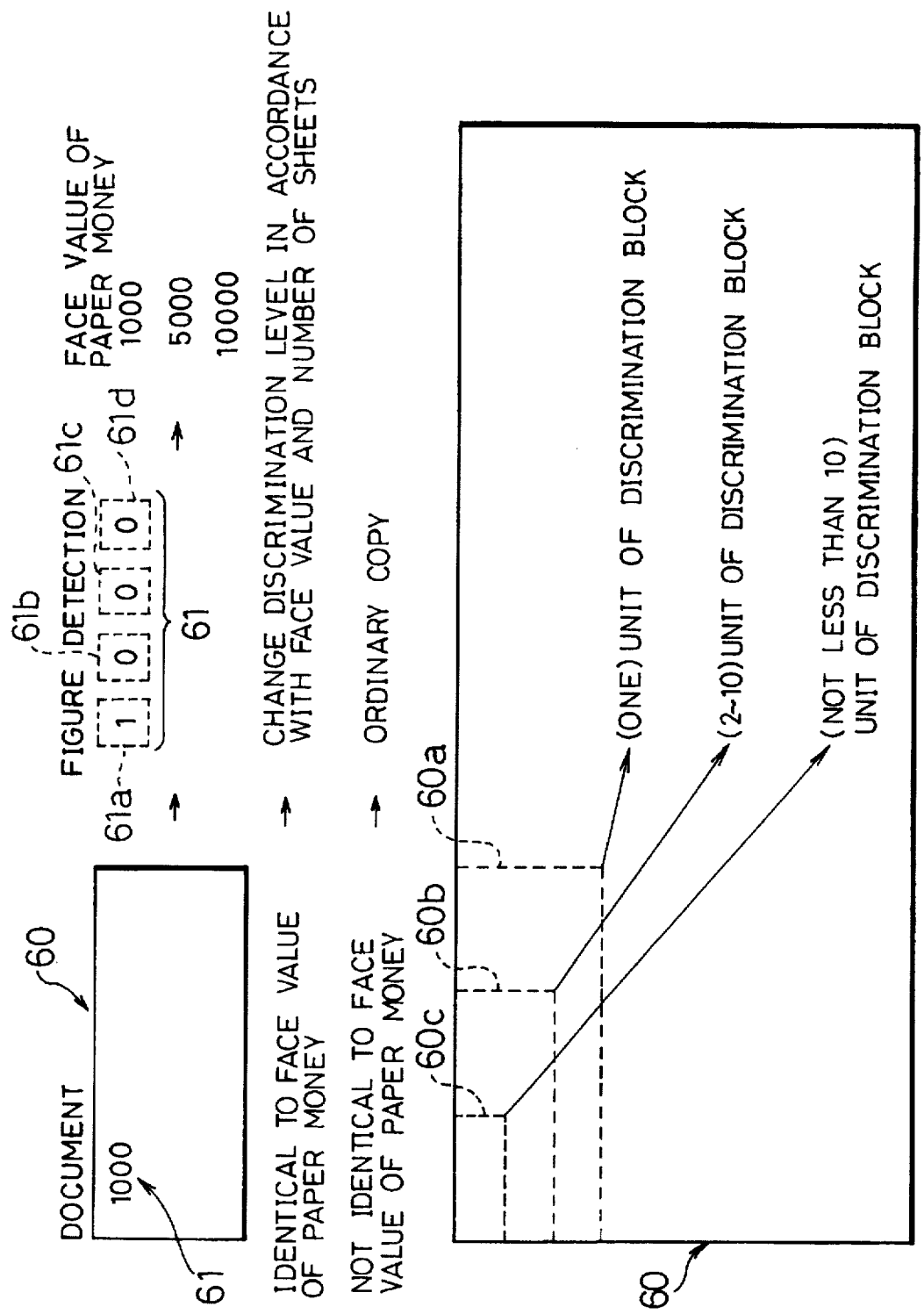
FIG. 9 is an explanatory drawing that shows an outline of the controlling operation shown in FIG. 8.

As was described earlier by reference to S4 in FIG. 8, if a figure "1000" is detected from the figure portion 61 of the document 60 as shown in FIG. 9, a judgement is made as to whether or not the figure is identical to any face value of paper money (S5).

If the judgement shows that the figure is identical to a face value of paper money at S5, a confirmation is made as to the number of output copies that has been specified (S11). Then, the specific-document judging section 55 selects a discrimination level that is suitable for the face value that is found to be identical to the figure on the document at S5 and the number of output copies that has been confirmed at S11, and the resulting level is set as the fourth discrimination level. This selection is made from discrimination levels that are provided in a step-wise manner in relation to face values and the numbers of output copies. Further, the specific-document judging section 55 controls the discrimination-level setting section 54 so that it supplies the discrimination patterns corresponding to the fourth discrimination level to the character-recognizing section 52 (S12).

For example, if the figure is 1000, the discrimination level for making a comparison based on binary-coded images is set as the fourth discrimination level; if the figure is 5000, the discrimination level for making a comparison based on black-and-white, multi-gradation images is set as such; and if the figure is 10000, the discrimination level for making a comparison based on full-color images is set as such. The discrimination patterns that correspond to the respective discrimination levels are supplied to the character-recognizing section 52.

Further, in addition to this setting, the following setting is adopted: upon making a discrimination, the document image is divided into blocks and the number of the divisions is changed in accordance with the number of output copies. In other words, as shown in FIG. 9, if the number of output copies is set to one sheet, the document 60 is divided into a plurality of blocks by using a block 60a as one unit; if the number of output copies is set to 2 to 10 sheets, a block 60b is used as one unit; and if the number of output copies is set to more than 11 sheets, a block 60c is used as one unit.

As is clearly shown in FIG. 9, the greater the number of output copies specified, the larger the block unit to be used to divide the document 60, thereby providing a more detailed discrimination.

Then, a judgement is made again as to whether or not the figure in the document is identical to the figure in the face value of paper money by using the fourth discrimination level that is set in accordance with the face value and the number of output copies (S7). In the same manner as shown in FIG. 4, if the judgement shows that it is identical to the figure in the face value of paper money, a warning display is given on the liquid crystal display panel 50 in the operation panel 48 through the controlling operation of the operation panel control section 47, and the copying operation of the copying machine main body 26 is stopped (S8) through the controlling operation of the output control section 57. Moreover, if the judgement is "NO" at S4, S5 and S7, it is determined that the character in question is neither a figure, nor a face value of paper money, and that the document in question is not paper money; therefore, the ordinary copying operation is carried out (S9).

As described above, a figure is detected as a character from an image of a document, and if the figure is identical to any face value of paper money, a re-judgement is made by upgrading the level of discrimination in accordance with the face value and the number of outputs specified and using discrimination patterns that allow the image of the figure in the document to be examined in more detail. In the same manner as described earlier, this arrangement makes it possible to reduce the possibility of losses due to paper-money counterfeit.

Furthermore, in the anti-counterfeiting device of the present embodiment for use in a digital copying machine, it is possible to detect not only figures, as described above, but also symbols, upon detecting any characters.

Next, referring to a flow chart, shown in FIG. 10, as well as FIG. 11, an explanation will be given on a controlling operation wherein: a figure is detected from a document as a character; if the figure is identical to any unit symbol in paper money, a judgement is made as to whether or not the document is paper money after upgrading the level of discrimination; and if the judgement is made as such, a warning is given and the copying operation is stopped. In this case, it is supposed that a document 62, which contains an area 63 having a printed face value "1000 YEN" shown in FIG. 11, is placed on the apparatus.

Figure 10:
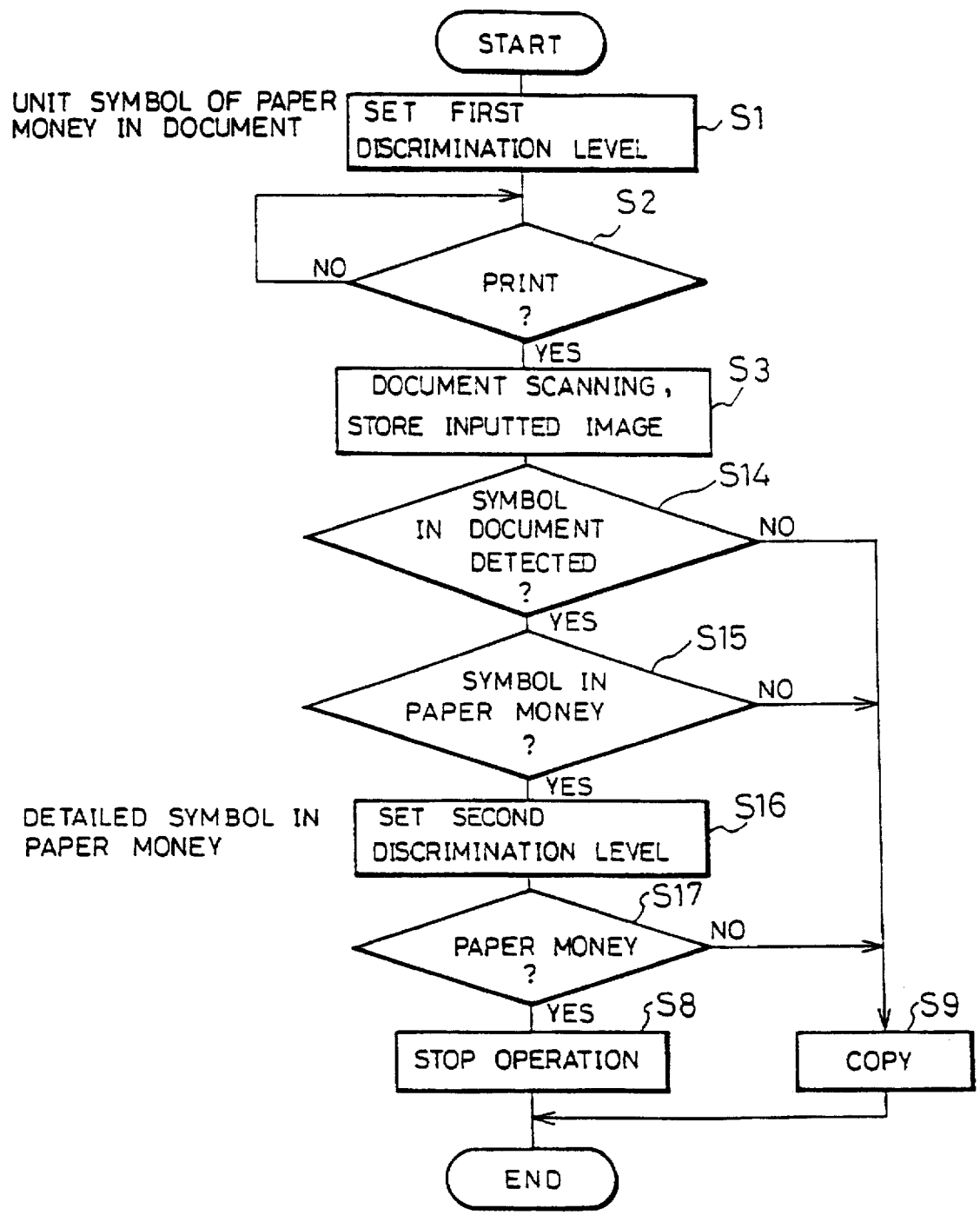
FIG. 10 is a flow chart showing a controlling operation that is carried out so as to prevent counterfeiting by detecting symbols of paper money in the anti-counterfeiting device of the present invention for use in the digital copying machine.
Figure 11:
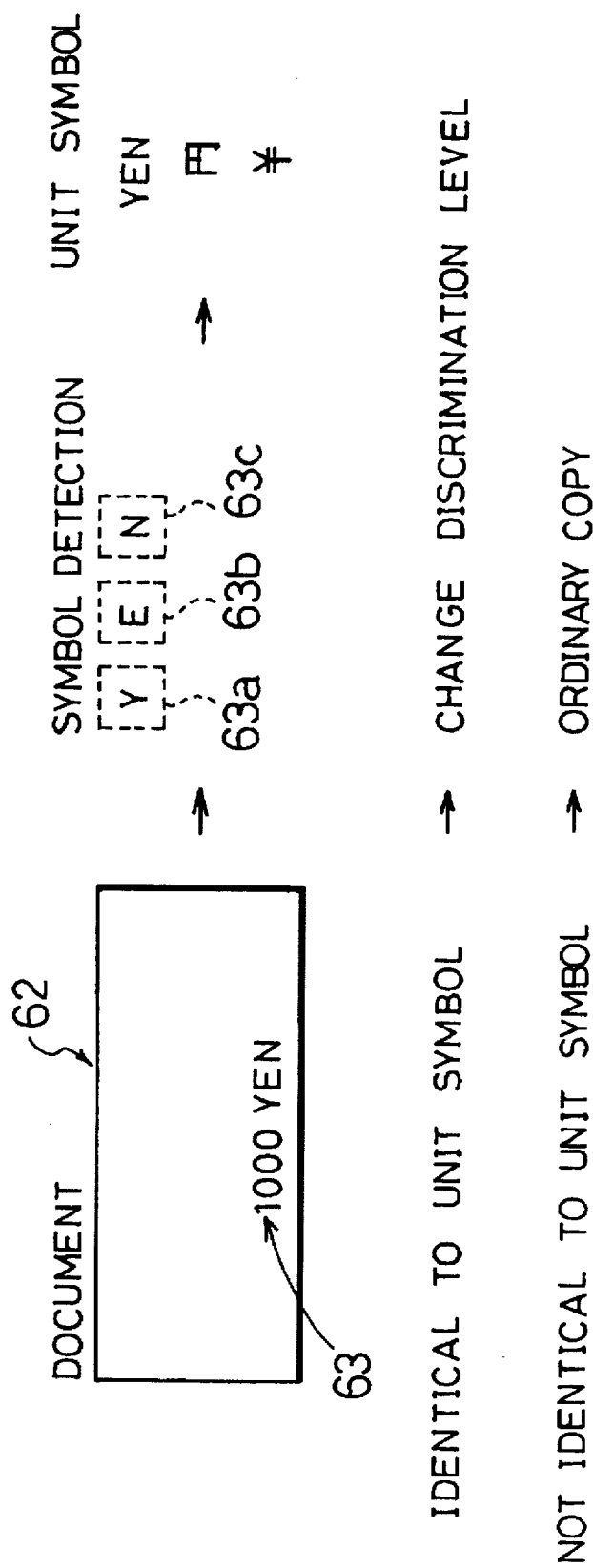
FIG. 11 is an explanatory drawing that shows an outline of the controlling operation shown in FIG. 10.
Figure 12:
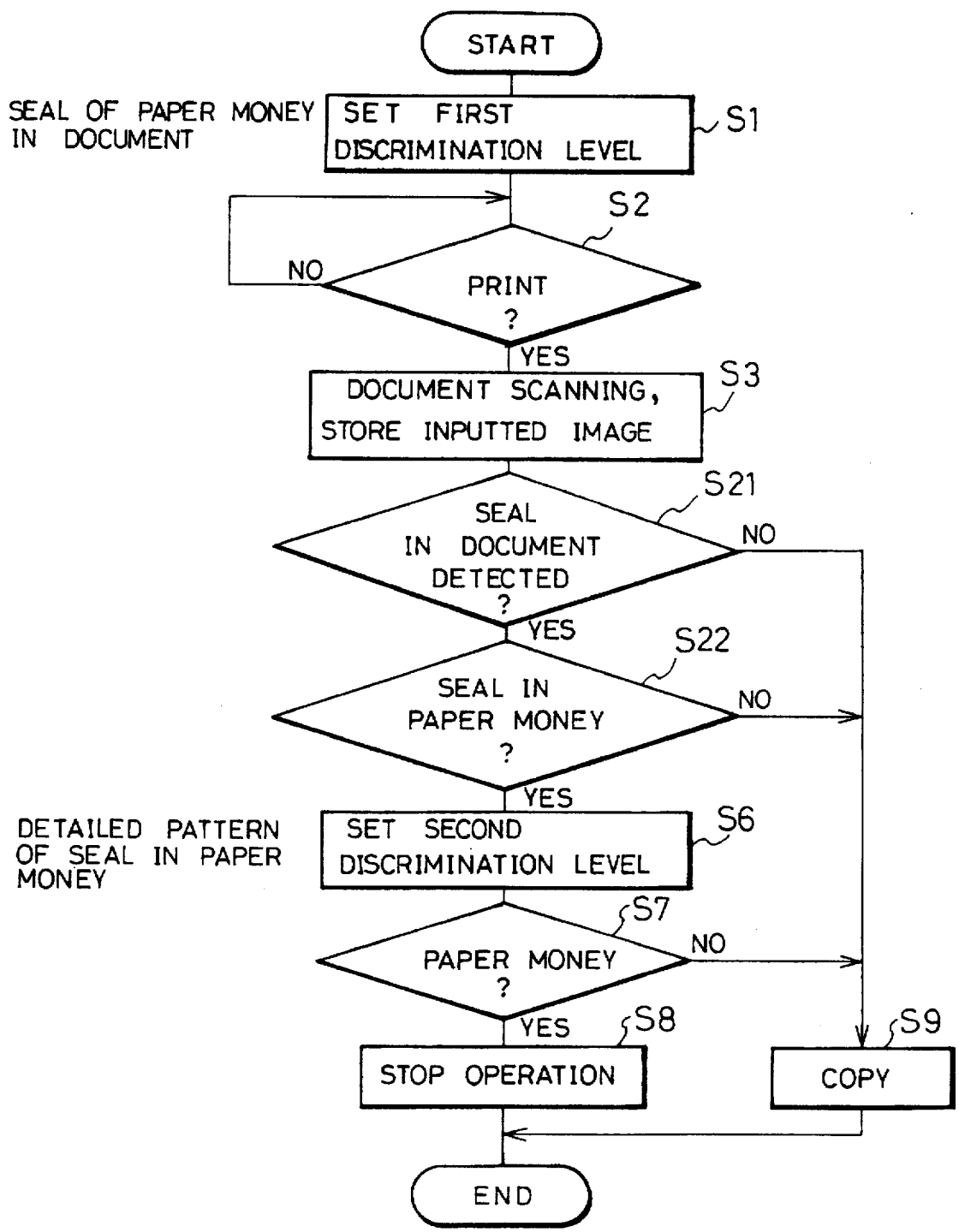
FIG. 12 is a flow chart showing a controlling operation that is carried out so as to prevent counterfeiting by detecting seals of paper money in the anti-counterfeiting device of the present invention for use in the digital copying machine.
Figure 13:
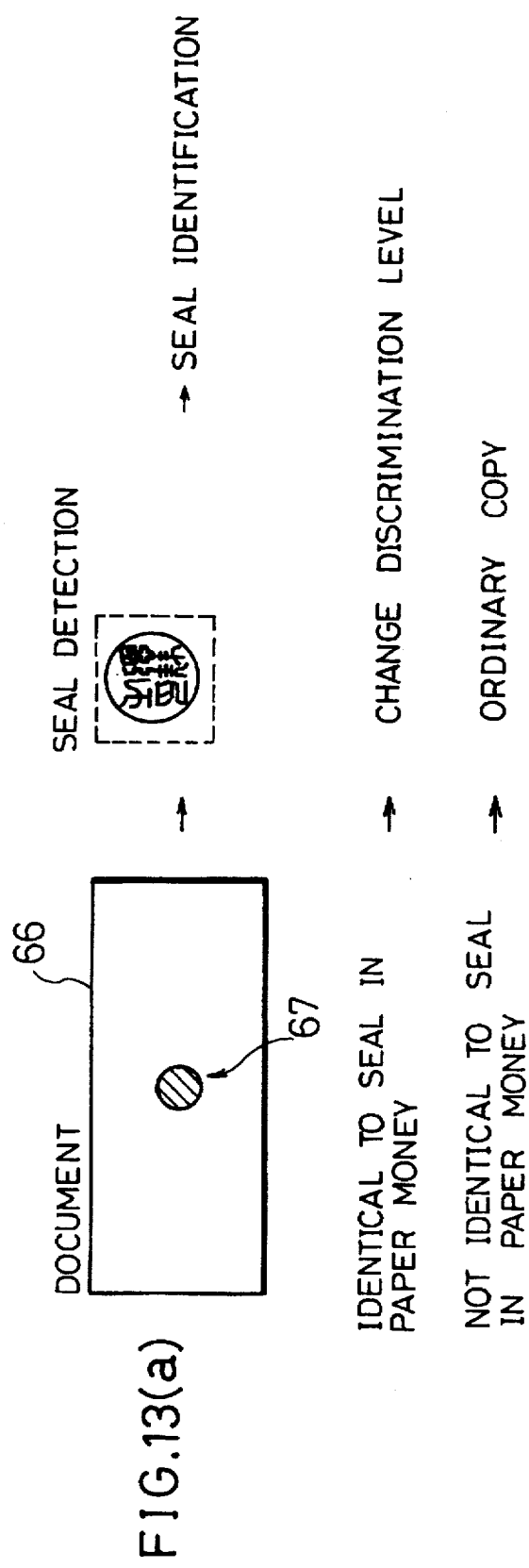
FIG. 13(a) is an explanatory drawing that shows an outline of the controlling operation shown in FIG. 12.
FIG. 13(b) is an explanatory drawing that shows an example of a seal that is printed on paper money.

As shown in FIG. 10, in order to make a judgement as to whether or not a figure used in a document is identical to any unit symbol in paper money, such as YEN, ¥, or S, the first discrimination level, which is a lower level in discrimination patterns, is set (S1).

When the print key is depressed by the user (S2), the scanner 22 scans a document, and the image of the document 62 thus read is stored in the RAM 45 (S3).

Successively, the character-detecting section 51 carries out a symbol detection as to whether or not the document image contains a symbol (S14). If a symbol is detected, a judgement is made as to whether or not the symbol is identical to any unit symbol in paper money (S15). Here, as for this detection as to whether or not the document image contains a symbol in its characters, it is possible to apply a method of extracting features of characters as well as a method of using character recognition, in the same manner as the aforementioned step S5. More specifically, the area 63, which has been detected by the character-detecting section 51, is further divided into, for example, graphic units 63a, 63b and 63c. Here, although not shown in the drawing, the portion having the printed figure "1000" is also divided into respective graphic units in the same manner as described above. The judgement is made as to whether or not the symbol detected from the document is identical to any unit symbol in paper money based on these graphic units.

If the judgement shows that the symbol is identical to a unit symbol of paper money at S15, the specific-document judging section 55 sets the second discrimination level, which is a level higher than the first discrimination level in discrimination patterns, in order to make a more detailed check on the symbol. In other words, the specific-document judging section 55 controls the discrimination-level setting section 54 so that it supplies the discrimination patterns corresponding to the second discrimination level to the character-recognizing section 52 (S16). Here, the discrimination patterns corresponding to the second discrimination level are image patterns of unit symbols in paper money that are expressed in more detail compared to the discrimination patterns corresponding to the first discrimination level. Then, a judgement is made again as to whether or not the image of the symbol in the inputted document is identical to the unit symbol of paper money by using the second discrimination level (S17). If the judgement shows that it is identical to the unit symbol of paper money, warning display is given on the liquid crystal display panel 50 in the operation panel 48 through the controlling operation of the operation panel control section 47, and the copying operation of the copying machine main body 26 is stopped (S8) through the controlling operation of the output control section 57.

Moreover, if the judgement is "NO" at S14, S15 and S17, it is determined that the character in question is neither a figure, nor a face value of paper money, and that the document in question is not paper money; therefore, the ordinary copying operation is carried out (S9).

As described above, a symbol is detected as a character from an image of a document, and if the symbol is identical to any unit symbol printed on paper money, a re-judgement is made by upgrading the level of discrimination and using discrimination patterns that allow the image of the symbol in the document to be examined in more detail. This arrangement makes it possible to improve the reliability of the judgement as to whether or not the document in question is paper money. In other words, two judgement-making steps are made: the first judgement is made by using discrimination patterns at a lower level, and only in the case where a document appears to be paper money, the second judgement is made based on a higher-level examination. Therefore, this reduces the possibility of misjudgement that a document, which is not paper money, is judged as paper money, thereby improving the reliability of the anti-counterfeiting device. Moreover, different from the conventional method wherein a document is compared with the entire portion of paper money, the above-mentioned control operation restricts the object for reference of judgement to unit symbol portions on paper money. This makes it possible to simplify the judgement and reduce the burden that is imposed during judgement, thereby reducing the judging time.

Moreover, in the present anti-counterfeiting device, it is possible to detect seals and other articles printed on paper money as one form of characters by using the character-detecting section 51. In other words, a seal on a document is detected as a character, and if the seal is identical to any seal of paper money in its shape and size, a judgement is made as to whether or not it is paper money after upgrading the level of discrimination. If the judgement shows that it is paper money, a warning is given and the copying operation is stopped. Referring to a flow chart, shown in FIG. 12, as well as FIGS. 13(a) and 13(b), the following description will discuss this controlling operation.

Here, as for seals printed on paper money, for example, a stamp 69 printed on the right hand in the center of the 10-dollar bill 68 shown in FIG. 13(b), or other seals and logos that are printed on paper money in various countries with their inherent designs, may be listed. Here, anything may be used as long as it shows an identification of paper money: this arrangement is not intended to be limited to the above-mentioned seal or logo.

In this case, it is supposed that a document 66 whereon a seal 67 is put or printed as shown in FIG. 13(a) is placed on the apparatus.

First, in order to make a judgement as to whether or not a seal used in a document is identical to any seal printed on paper money, the specific-document judging section 55 sets the first discrimination level, which is a lower level in discrimination patterns (S1). Next, when the print key is depressed by the user (S2), the document 66 is scanned, and the image of the document 66 is stored in the RAM 45 (S3).

Successively, the character-detecting section 51 carries out a detection as to whether or not the image of the document stored in the RAM 45 contains a seal (S21). Here, as for this detection as to whether or not the image of the document contains a seal, it is possible to apply a method of extracting features of characters as well as a method of using character recognition, in the same manner as the aforementioned S5.

If a seal is detected from the image of the document at S21, a judgement is made as to whether or not the seal is identical to any seal printed on paper money (S22). More specifically, the judgement is made as to whether or not the seal is identical to any seal of paper money in its shape and size.

If the judgement shows that the seal in the document image is identical to a seal of paper money in its shape and size, the specific-document judging section 55 selects the second discrimination level, which is a level higher than the first discrimination level in discrimination patterns, and controls the discrimination-level setting section 54 so that it supplies the discrimination patterns corresponding to the second discrimination level to the character-recognizing section 52 (S6).

Then, the character-recognizing section 52 makes a more detailed judgement as to whether or not the seal in the document image is identical to the seal of paper money by using the second discrimination level (S7).

If the judgement shows that it is identical to the seal of paper money, a warning display is given on the liquid crystal display panel 50 in the operation panel 48, and the copying operation of the copying machine main body 26 is stopped (S8) through the controlling operation of the output control section 57.

Moreover, if the judgement is "NO" at S21, S22 and S7, it is determined that the seal in question is neither a seal, nor a seal of paper money, and that the document in question is not paper money; therefore, the ordinary copying operation is carried out (S9).

As described above, first, a judgement is made as to whether or not a seal, which has been detected from a document as a character by the character-detecting section 51, is identical to any seal printed on paper money in its shape and size, and if the seal is identified as such, a more detailed re-judgement is made on the seal portion in question by upgrading the level of discrimination. This arrangement makes it possible to improve the reliability of the anti-counterfeiting device as well as shortening the judging time in the same manner as described earlier.

As described above, in the anti-counterfeiting device of the present invention for use in the digital copying machine, the character-detecting section 51 first detects a character, such as a figure, a symbol or a seal, from an image that has been read from a document and that has been stored in the RAM 45. Upon detection of any character, the discrimination-pattern setting section 54 reads discrimination patterns at a low level from the paper-money-pattern storing section 53, and supplies them to the character-recognizing section 52. According to these discrimination patterns, the character- recognizing section 52 makes a judgement as to whether or not the character in question of the document image detected by the character-detecting section 51 is identical to any one of the characters, that is, face values of paper money, unit symbols, such as YEN, ¥, and S, and seals of paper money.

If it is judged that the character is identified in the discrimination patterns in the low level, the specific-document judging section 55 controls the discrimination-level setting section 54 so that it supplies the character-recognizing section 52 with discrimination patterns at a higher level. Then, the character-recognizing section 52 makes a more detailed re-judgement as to whether or not the character in question is identical to any character, such as a face value, a unit symbol or a seal, by using the discrimination-patterns at the higher level.

Conventionally, the entire portion of paper money has been used as an object for identification in order to make a judgement as to whether or not the document in question is paper money; this results in prolonged processing time for judgement. In contrast, the present embodiment restricts the object for identification to character portions on paper money. This makes it possible to simplify the judgement and reduce the burden in the discrimination, thereby reducing the judging time while maintaining accuracy in judgement. Further, even in the case of a doubtful discrimination, the discrimination is again made after upgrading the level of discrimination, thereby ensuring the reliability of the device.

Embodiment 2

Figure 14:
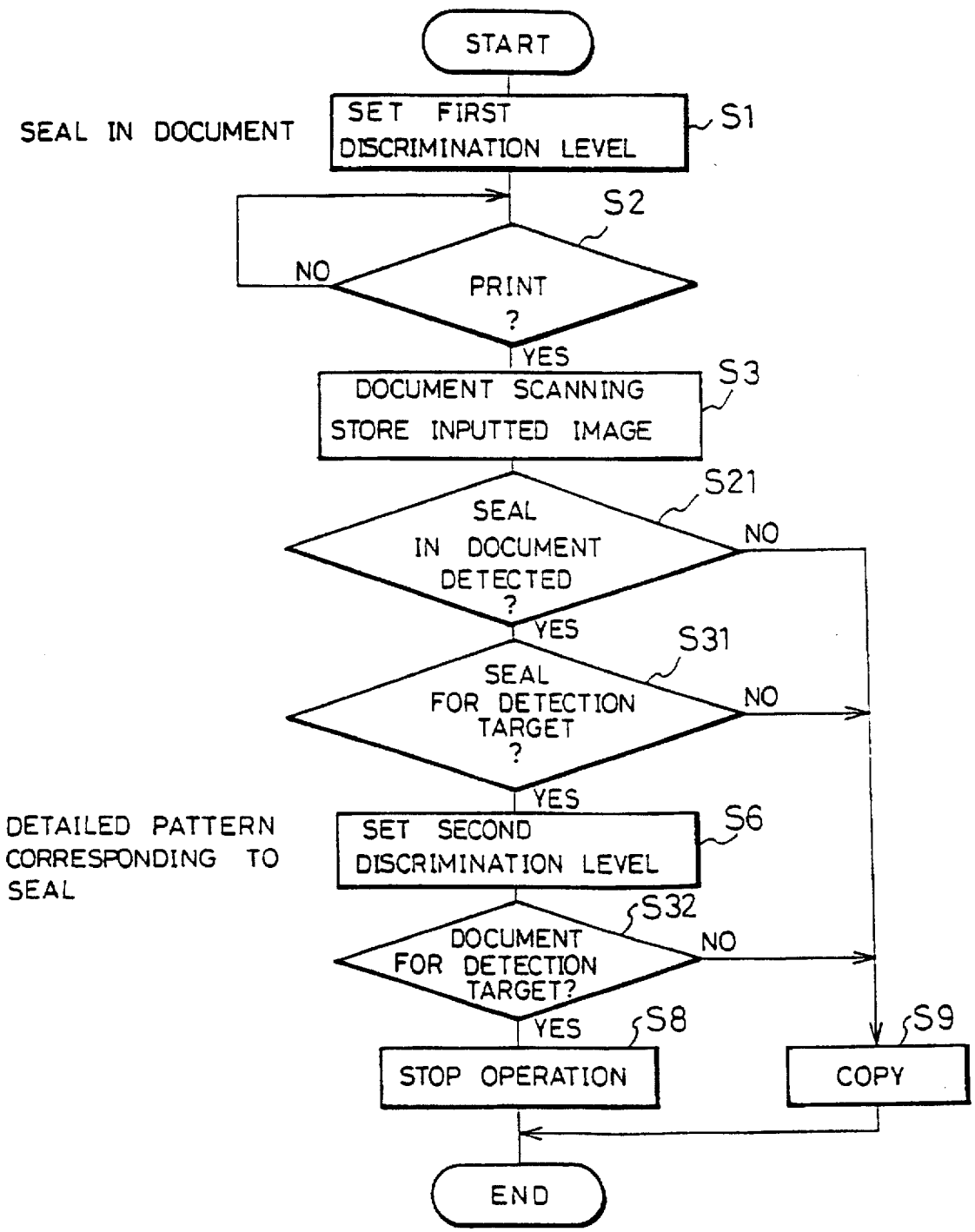
FIG. 14 is a flow chart showing a controlling operation that is carried out so as to prevent counterfeiting by detecting seals that are included in objects to be detected in an anti-counterfeiting device in another embodiment of the present invention for use in a digital copying machine.
Figure 15:
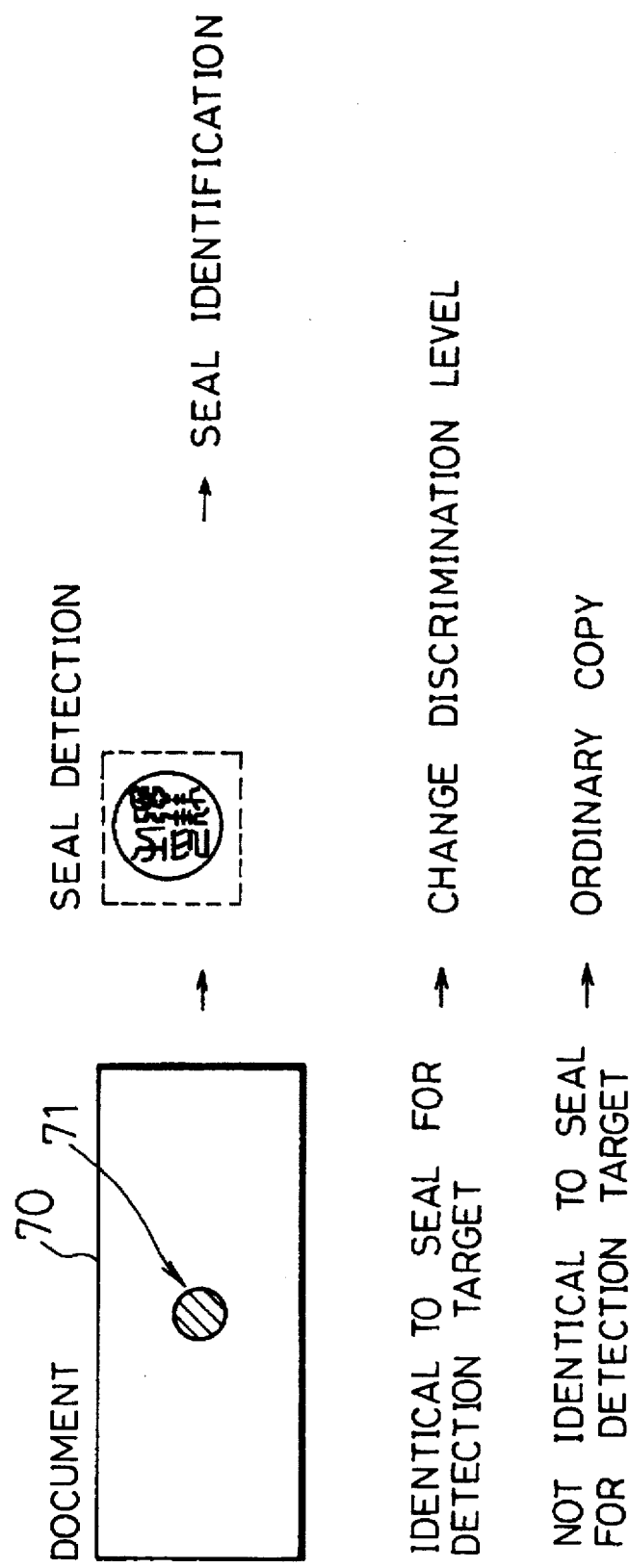
FIG. 15 is an explanatory drawing that shows an outline of the controlling operation shown in FIG. 14.

Referring to FIGS. 1, 14 and 15, the following description will discuss another embodiment of the present invention. Here, for convenience of explanation, those members that have the same functions and that are described in embodiment 1 with reference to its drawings are indicated by the same reference numerals and the description thereof is omitted.

In the anti-counterfeiting device of the present embodiment for use in the digital copying machine, a seal-storing section 56 (seal storage), shown in FIG. 1, stores seals that are put or printed on specific documents the copies of which are to be prohibited, such as paper money, securities and classified documents.

In the anti-counterfeiting device, the specific documents are detected by detecting seals from documents as characters. When any possible specific document is detected, a further judgement is made as to whether or not the document in question is a specific document by upgrading the level of discrimination and comparing the seal on the document with the seal on the specific document more closely. If the judgement is made as such, a warning is given and the copying operation is stopped.

Here, as shown in FIG. 15, it is supposed that a document 70 whereon a seal 71 is put or printed is placed on the apparatus.

As shown in FIG. 14, in order to make a judgement as to whether or not a seal used in a document is identical to any seal put or printed on one of specific documents, the first discrimination level, which is a lower level in discrimination patterns, is set (S1).

When the print key is depressed (S2), the document 70 is scanned, and the image of the document is stored in the RAM 45 (S3).

Successively, a seal detection is carried out to find whether or not the document image contains a seal that is identical to any seal of specific documents stored in the seal-storing section 56 (S21). As for this detection as to whether or not the document image contains any seal, it is possible to apply a method of extracting features of characters as well as a method of using character recognition, in the same manner as S5 of Embodiment 1.

When the seal 71 is detected at S21, a judgement is made as to whether or not the seal 71 is identical to any seal used in one of the specific documents (S31). More specifically, the judgement is made as to whether or not the seal 71 is identical to any seal stored in the seal-storing section 56 in its shape and size.

If the judgement shows that the seal 71 on the document is identical to a seal of one of the specific documents, the second discrimination level, which is a level higher than the first discrimination level in discrimination patterns, is set in order to make a more detailed check on the seal (S6). In other words, the specific-document judging section 55 controls the discrimination-level setting section 54 so that it receives the discrimination patterns corresponding to the second discrimination level from the seal-storing section 56 and supplies them to the character-recognizing section 52.

Then, the character-recognizing section 52 makes a re-judgement as to whether or not the seal 71 on the document 70 is identical to the seal of one of the specific documents by using the second discrimination level (S32). As a result, if the seal is identified as such, a warning display is given on the liquid crystal display panel 50 in the operation panel 48, and the copying operation of the copying machine main body 26 is stopped (S8) through the controlling operation of the output control section 57.

Moreover, if the judgement is "NO" at S21, S31 and S32, it is determined that the seal in question is neither a seal, nor a seal of a specific document, and that the document in question is not a specific document; therefore, the ordinary copying operation is carried out (S9).

As described above, in the anti-counterfeiting device of the present embodiment for use in the digital copying machine, the character-detecting section 51 detects the seal 71 from the document image that have been read from the document 70. Upon detection of the seal 71, the character-recognizing section 52 functioning as the seal judger, which is first supplied with discrimination patterns in a lower level from the discrimination-level setting section 54, makes a judgement as to whether or not the seal 71 is identical to any seal that is used in, for example, paper money, securities and classified documents and that has been stored in the seal-storing section 56. When the judgement shows that the seal is identified in the discrimination patterns in the lower level, the specific-document judging section 55, controls the discrimination-level setting section 54 so that it supplies the character-recognizing section 52 with discrimination patterns at a higher level. Then, the character-recognizing section 52 make a judgement again as to the identification by using the discrimination patterns at the higher level.

Conventionally, in order to make a judgement as to whether or not a document in question is any one of various specific images such as paper money, securities and classified documents, the entire portion of various specific images has been used as an object for identification; this results in prolonged processing time for judgement. In contrast, the present embodiment restricts the object for identification to seal portions on the various specific images, that is, makes the judgement by using only seals. This makes it possible to simplify the judgement and reduce the burden in the discrimination, thereby reducing the judging time. Further, even in the case of a doubtful discrimination, the reliability of the discrimination is maintained by upgrading the level of discrimination. In other words, it is possible to shorten the judging time while maintaining the reliability of the discrimination.

Moreover, this arrangement allows the device to deal with not only paper money but also various articles, such as securities and classified documents, from which the image-outputting operation should be prohibited; therefore, the applicability of the device is improved.

Embodiment 3

Figure 16:
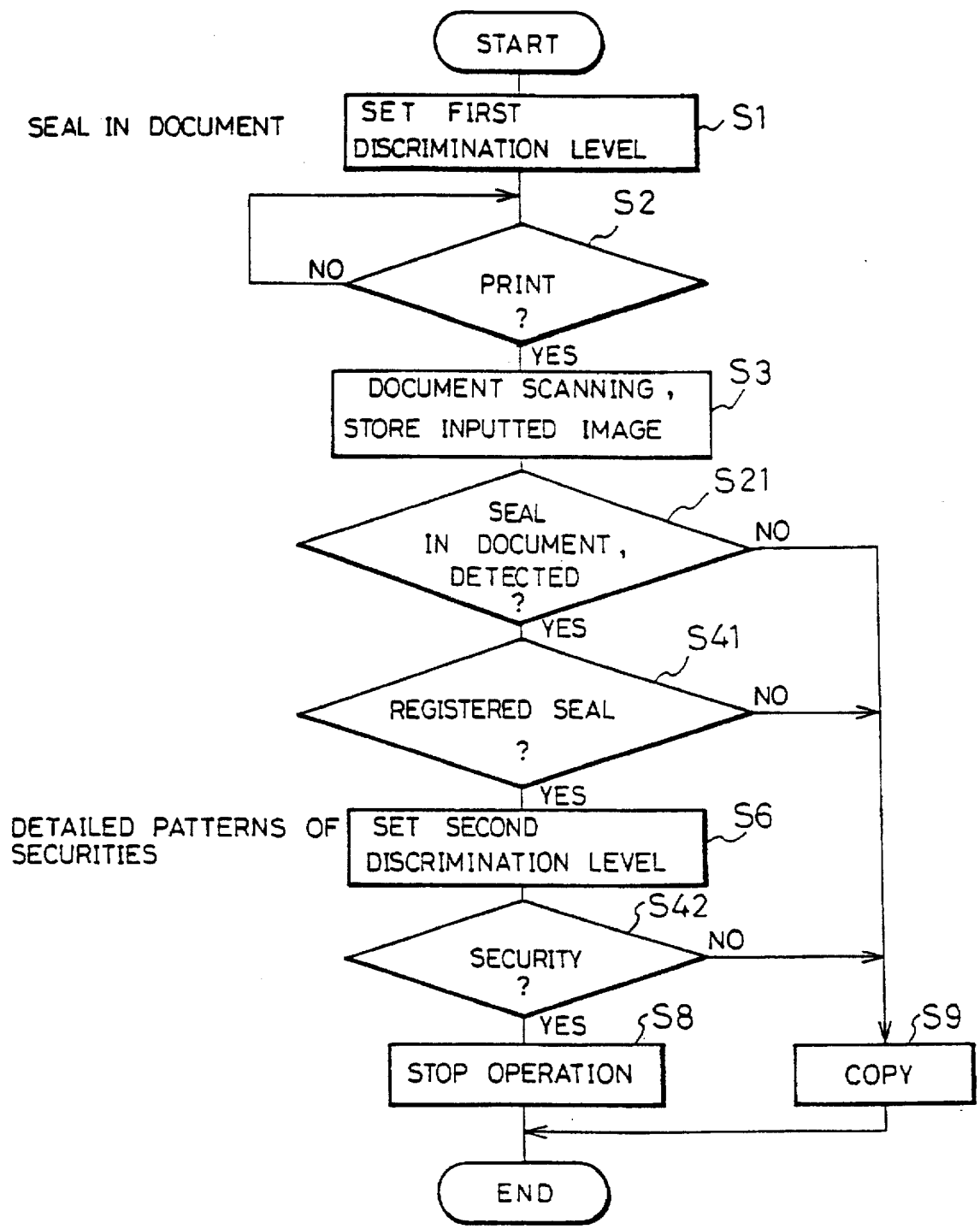
FIG. 16 is a flow chart showing a controlling operation that is carried out so as to prevent counterfeiting in securities by detecting seals in an anti-counterfeiting device in still another embodiment of the present invention for use in a digital copying machine.
Figure 17:
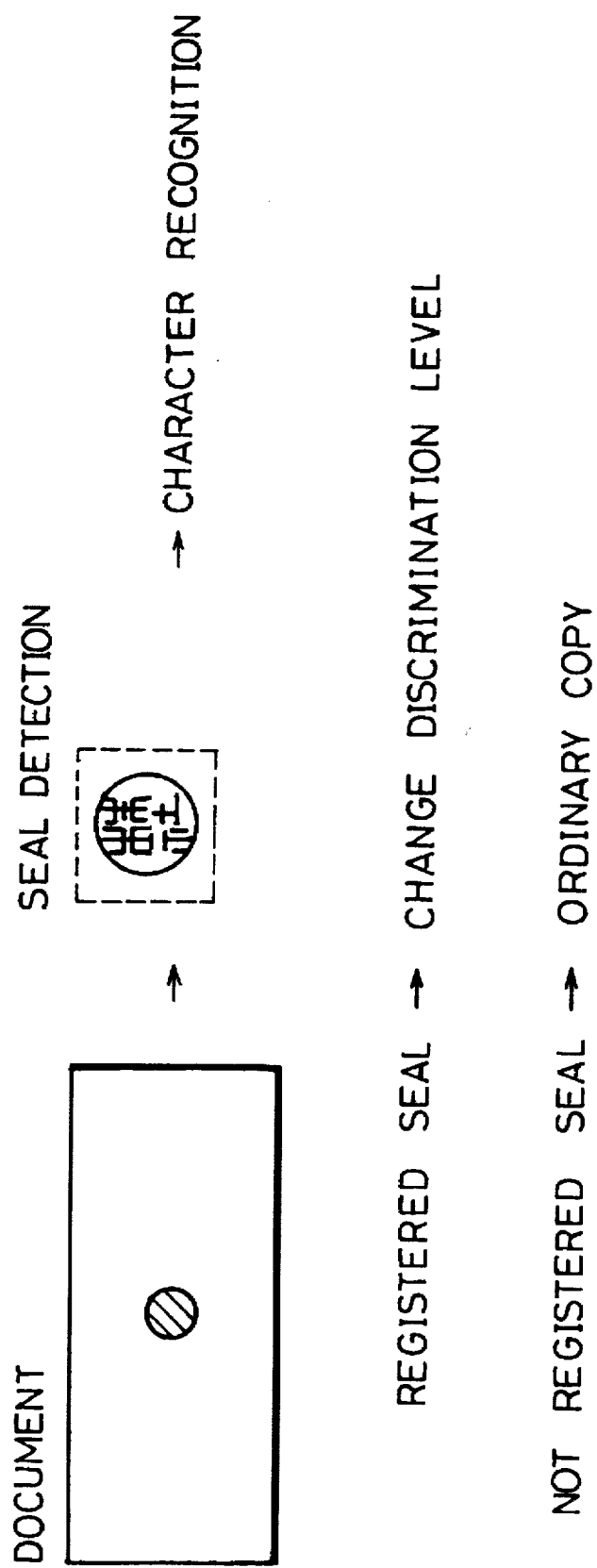
FIG. 17 is an explanatory drawing that shows an outline of the controlling operation shown in FIG. 16.

Referring to FIGS. 1, 16 and 17, the following description will discuss still another embodiment of the present invention. Here, for convenience of explanation, those members that have the same functions and that are described in the aforementioned Embodiment 1 and Embodiment 2 with reference to their drawings are indicated by the same reference numerals and the description thereof is omitted.

Meanwhile, it is a custom in Japan that registered seals, which are put on important documents such as securities, are made by using characters having a special style that are hard to recognize. In the anti-counterfeiting device of the present embodiment for use in the digital copying machine, a seal is detected as a character in a document; if the style of the seal is hard to recognize like that of a registered seal, a judgement is made as to whether or not the document in question is identical to any bond of securities that are output-prohibited documents after upgrading the level of discrimination; and if the judgement is made as such, a warning is given and the copying operation is stopped.

As shown in FIG. 16, in order to make a judgement as to whether or not a seal used in a document is identical to any seal used in output-prohibited documents that are possible targets for forgery or counterfeiting by using the style of the seal, the first discrimination level, which is a lower level in discrimination patterns, is set (S1). When the print key is depressed (S2), the document is scanned, and the image of the document is stored in the RAM 45 (S3).

Successively, a seal detection is carried out to find whether or not the document image contains a seal, in the same manner as S5 of Embodiment 1 (S21). If a seal is detected, a judgement is made as to whether or not the seal is a registered seal based on whether or not the seal is recognized as a character as well as based on its style (S41).

If the judgement shows that the seal is a registered seal, the second discrimination level, which is a level higher than the first discrimination level in discrimination patterns, is set in order to make a more detailed check on the seal (S6). Then, a judgement is made again as to whether or not the seal in the document image is identical to any seal on a security bond by using the second discrimination level (S42). If the judgement shows that it is identical to a seal of a security bond, a warning display is given on the liquid crystal display panel 50 in the operation panel 48, and the copying operation of the copying machine main body 26 is stopped (S8).

Moreover, if the judgement is "NO" at S21, S41 and S42, it is determined that the seal in question is neither a seal, nor a registered seal, and that the document in question is not a security bond; therefore, the ordinary copying operation is carried out (S9). FIG. 17 illustrates the above-mentioned controlling operation.

As described above, in the anti-counterfeiting device of the present embodiment for use in the digital copying machine, if the character-recognizing section 52 functioning as the seal detector, makes a judgement that a seal, which has been detected by the character-detecting section 51 shown in FIG. 1 as the seal detector, is not identical to any seal stored in the seal-storing section 56 functioning as the seal storage, and if a judgement is also made that the seal is a registered seal based on its style, the level of discrimination is increased.

Thus, the first judgement is made based on only the seal and its style; therefore, in the case of images that are objects whose image-outputting operation should be prohibited, it becomes possible to shorten discrimination-processing time, as well as making it possible to ensure the reliability of discrimination.

Embodiment 4

Referring to FIGS. 1, 18 through 27, the following description will discuss still another embodiment of the present invention. Here, for convenience of explanation, those members that have the same functions and that are described in the aforementioned Embodiments 1 through with reference to their drawings are indicated by the same reference numerals and the description thereof is omitted.

The anti-counterfeiting device of the present embodiment for use in the digital copying machine provides controlling operations wherein: a seal is detected as a character in a document; in accordance with the results of the seal detection, a judgement is made as to whether the document in question is included in output-prohibited documents; and the copying operation is restricted.

Figure 18:
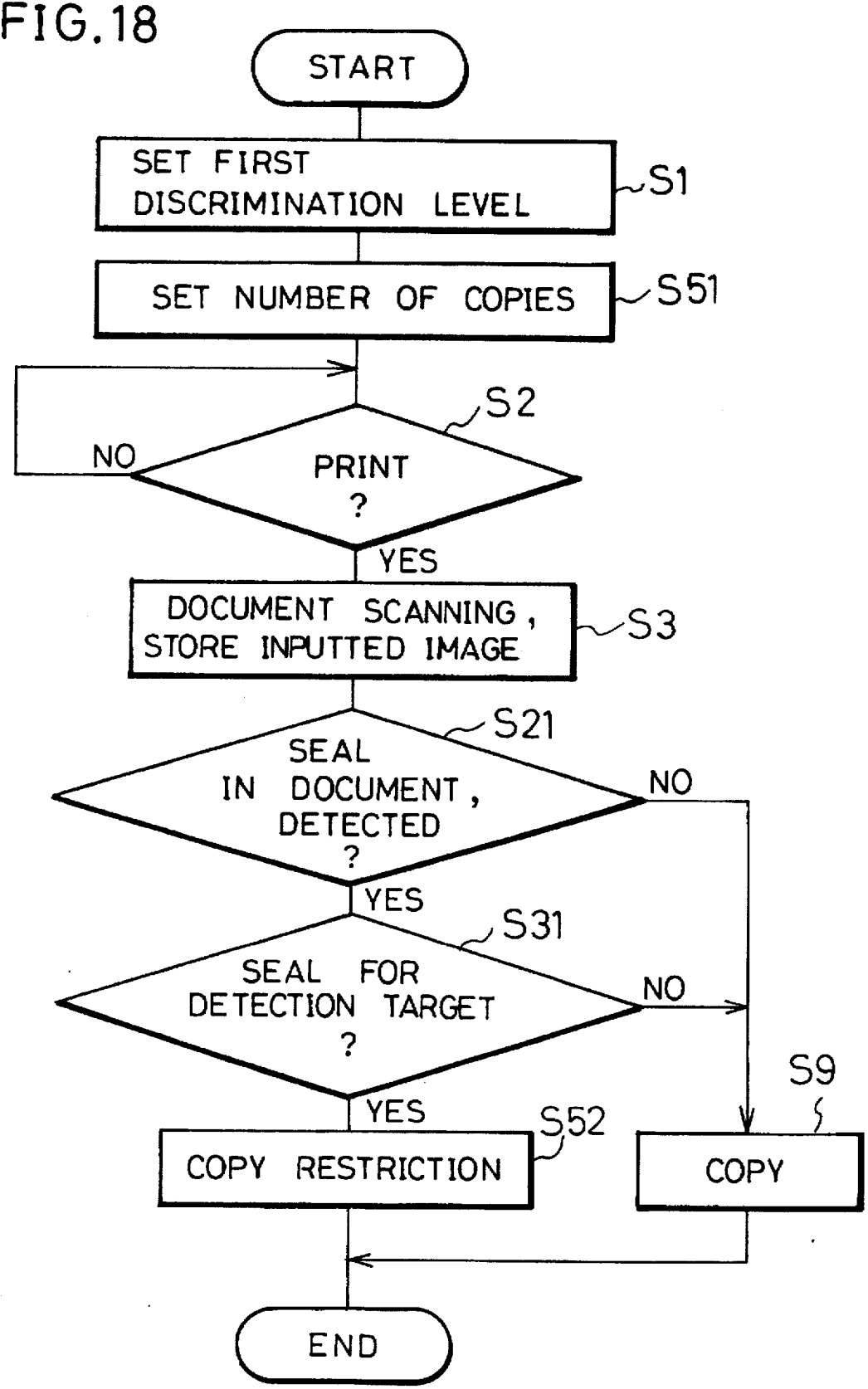
FIG. 18 is a flow chart showing a controlling operation that is carried out so as to restrict output copies to the permissible number of copies by detecting seals in an anti-counterfeiting device in still another embodiment of the present invention for use in a digital copying machine.

As shown in FIG. 18, in order to make a judgement as to whether or not a seal used in a document is identical to any seal used in output-prohibited documents that are possible targets for forgery or counterfeiting by using the style of the seal, the first discrimination level, which is a lower level in discrimination patterns, is set (S1). Next, the number of sheets of copies, that is, the number of output copies, is entered through the ten keys 49 in the operation panel 48 (S51). When the print key is depressed (S2), a document is scanned, and the inputted image is stored in the RAM 45 (S3).

Successively, a seal detection is carried out to find whether or not the document image contains a seal, in the same manner as S5 of Embodiment 1 (S21). If a seal is detected at S21, a judgement is made as to whether or not the seal is identical to any seal used in output-prohibited documents (S31). More specifically, the judgement is made as to whether or not the seal is identical to any seal of output-prohibited documents in its shape and size.

If the judgement shows that the seal is identical to a seal of an output-prohibited document, a warning display is given on the liquid crystal display panel 50 in the operation panel 48, and the copying operation of the copying machine main body 26 is restricted (S52).

Figure 19:
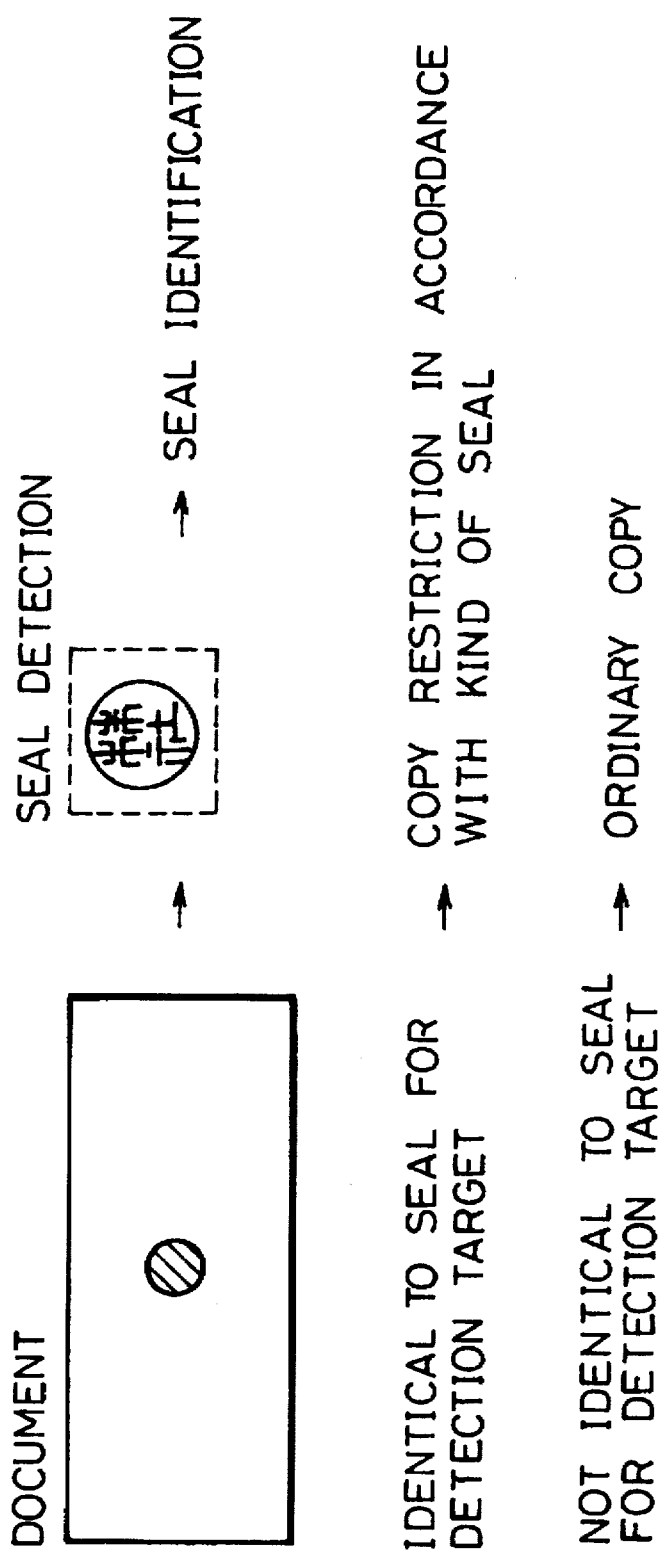
FIG. 19 is an explanatory drawing that shows an outline of the controlling operation shown in FIG. 18.

Moreover, if the judgement is "NO" at S21 and S31, it is determined that the seal in question is neither a seal, nor any seal used in output-prohibited documents; therefore, the ordinary copying operation is carried out (S9). FIG. 19 illustrates the above-mentioned controlling operation.

With this arrangement, the device makes a judgement that a document in question is important based on only the recognition of the seal; therefore, it is possible to prevent the copying machine from making unnecessarily large amount of copies.

Figure 20:
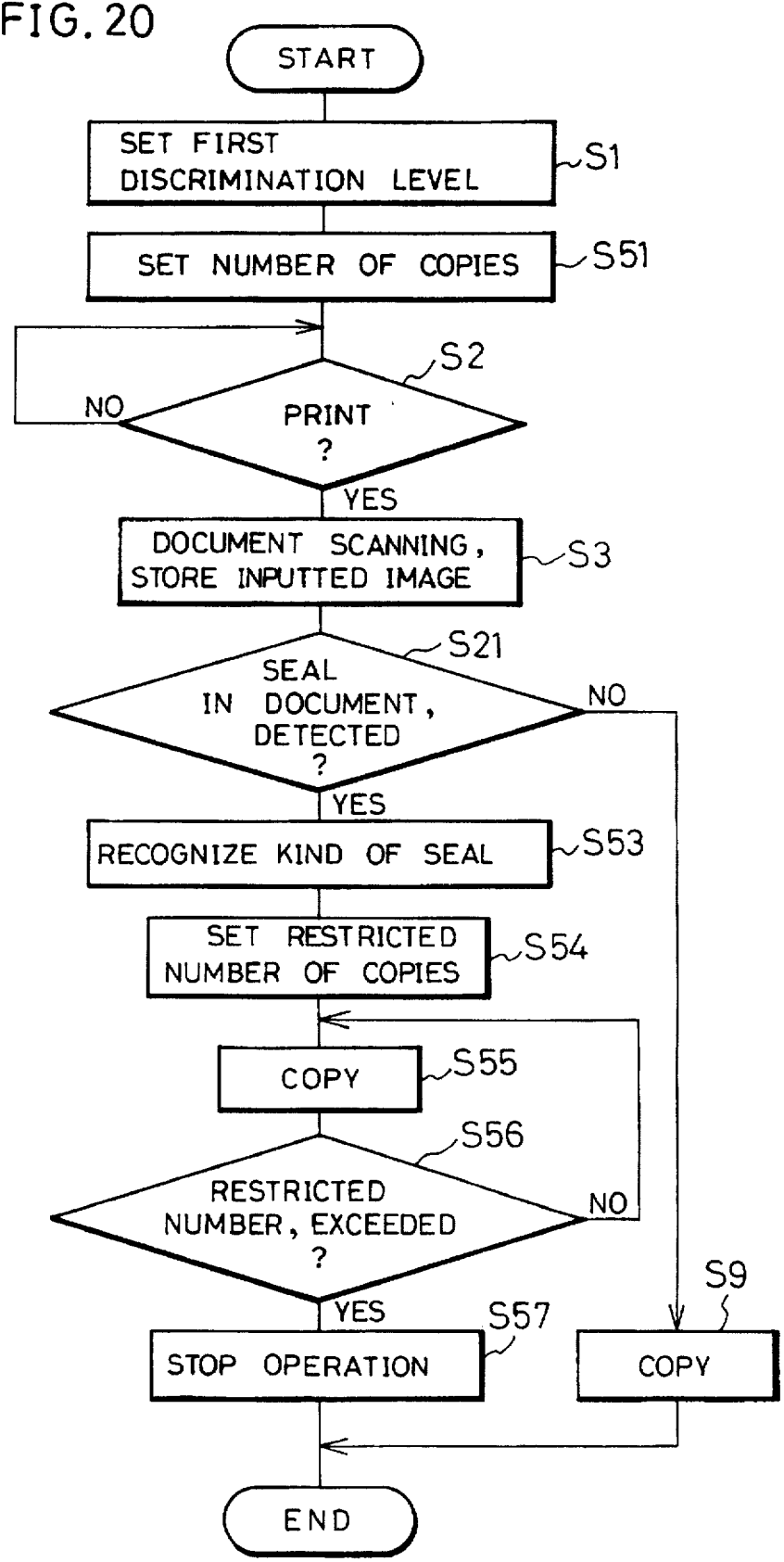
FIG. 20 is a flow chart showing a controlling operation that is carried out so as to restrict output copies to the permissible number of copies by detecting various seals in the above-mentioned anti-counterfeiting device for use in the digital copying machine.

Moreover, the present embodiment may provide another arrangement, wherein: a seal is detected as a character in a document; a judgement is made as to whether the seal is a signet, a registered seal, a company's seal, or another seal; and the permissible number of output copies is restricted in accordance with the kind of the seal. In this case, as shown in FIG. 20, upon detection of a seal at S21, the kind of the seal is identified by using the kinds of seals, that is, signets, registered seals, and company's seals, that have been preliminarily stored in the seal-storing section 56 (S53). The judgement is made based on the size and style of the seal.

Then, if the kind of the seal is identified as any kind of seals, that is, signets, registered seals, and company's seals, the number of output copies is restricted in accordance with the corresponding kind of the seal (S54). For example, the number is restricted to one copy for company's seals, to five copies for registered seals, and to ten copies for signets.

Figure 21:
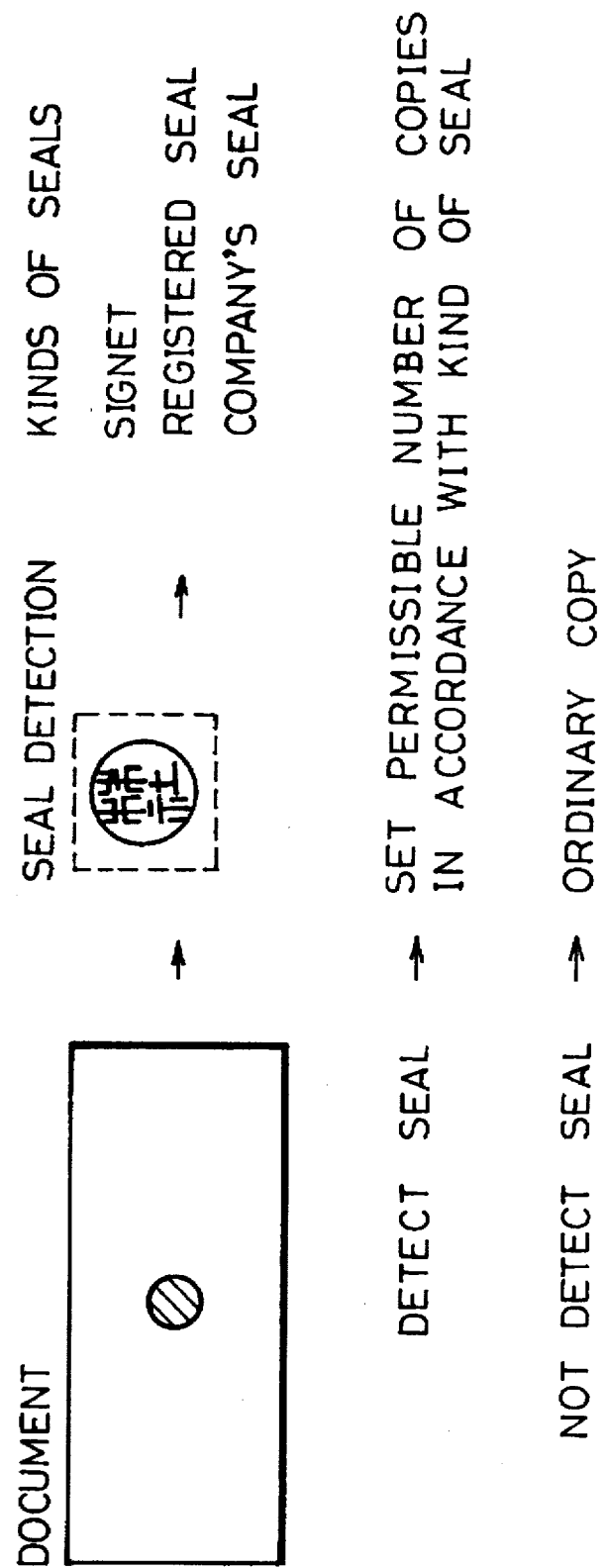
FIG. 21 is an explanatory drawing that shows an outline of the controlling operation shown in FIG. 20.

Next, the copying operation is carried out under this restriction (S55), and is continued until the number of output copies reaches the restricted number of copies while comparing the current number of copies with the restricted number of copies (S56). When the restricted number of copies is exceeded, a warning display is given on the liquid crystal display panel 50 in the operation panel 48, and the copying operation of the copying machine main body 26 is stopped (S57). FIG. 21 illustrates the above-mentioned controlling operation.

With this arrangement, the device makes a judgement as to whether or not a document in question is important based on the kind, size and shape of the seal, and if the judgement is made as such, the copying operation is stopped so as not to make an unnecessarily large amount of copies, in accordance with the degree of importance.

Further, it is possible to adopt another arrangement wherein: a seal is detected as a character in a document; a judgement is made as to whether or not the seal is one of the registered seals that are put on copy-permissible documents; and if the seal is not registered, a warning is given and the copying operation is stopped.

Figure 22:
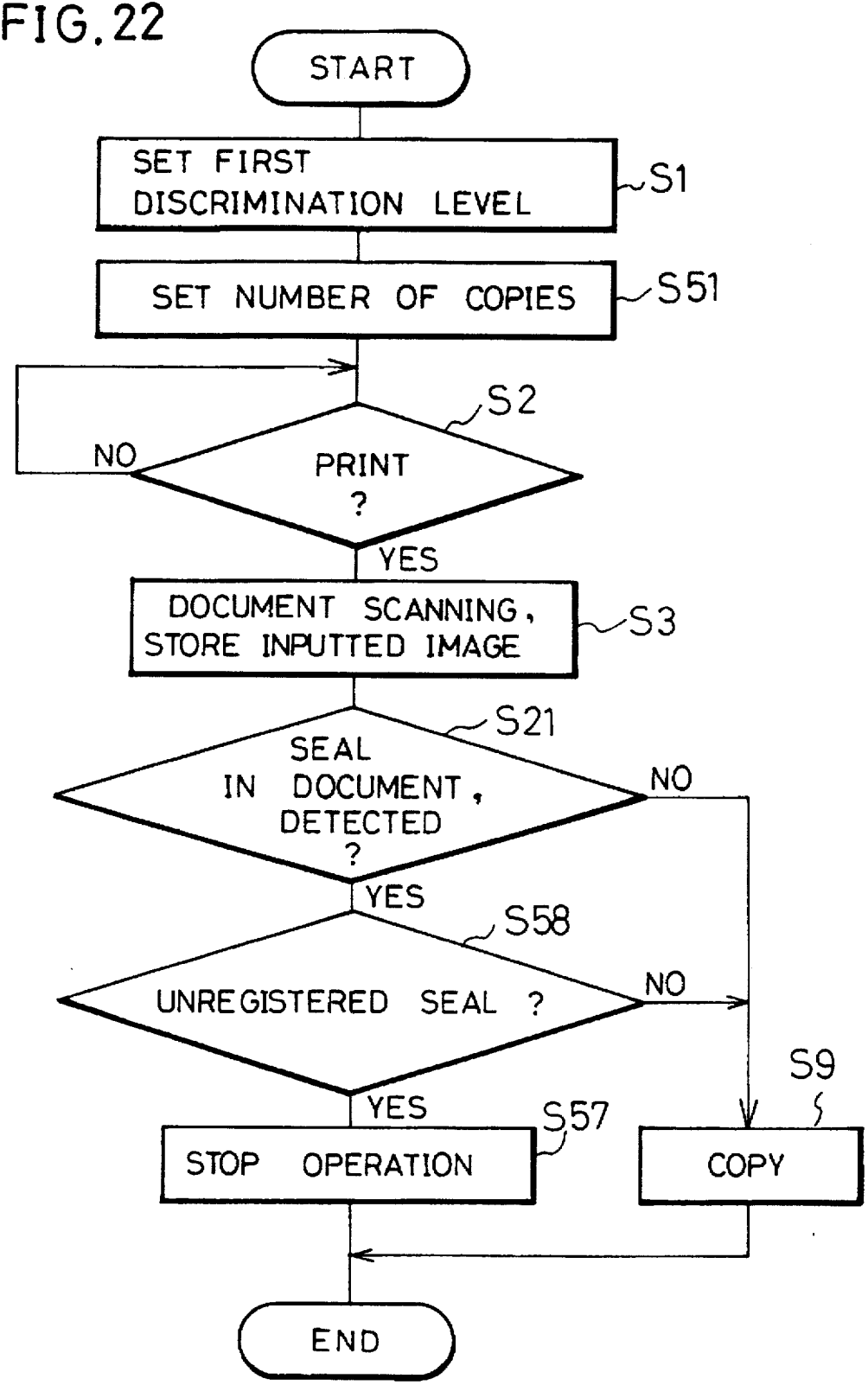
FIG. 22 is a flow chart showing a controlling operation that is carried out so as to prevent counterfeiting by detecting unregistered seals in the above-mentioned anti-counterfeiting device for use in the digital copying machine.

In this case, as shown in FIG. 22, upon detection of a seal at S21, a judgement is made as to whether or not this seal is one of the seals that have been preliminarily registered in the seal-storing section 56 shown in FIG. 1, based on the size and style of the seal (S58).

Figure 23:
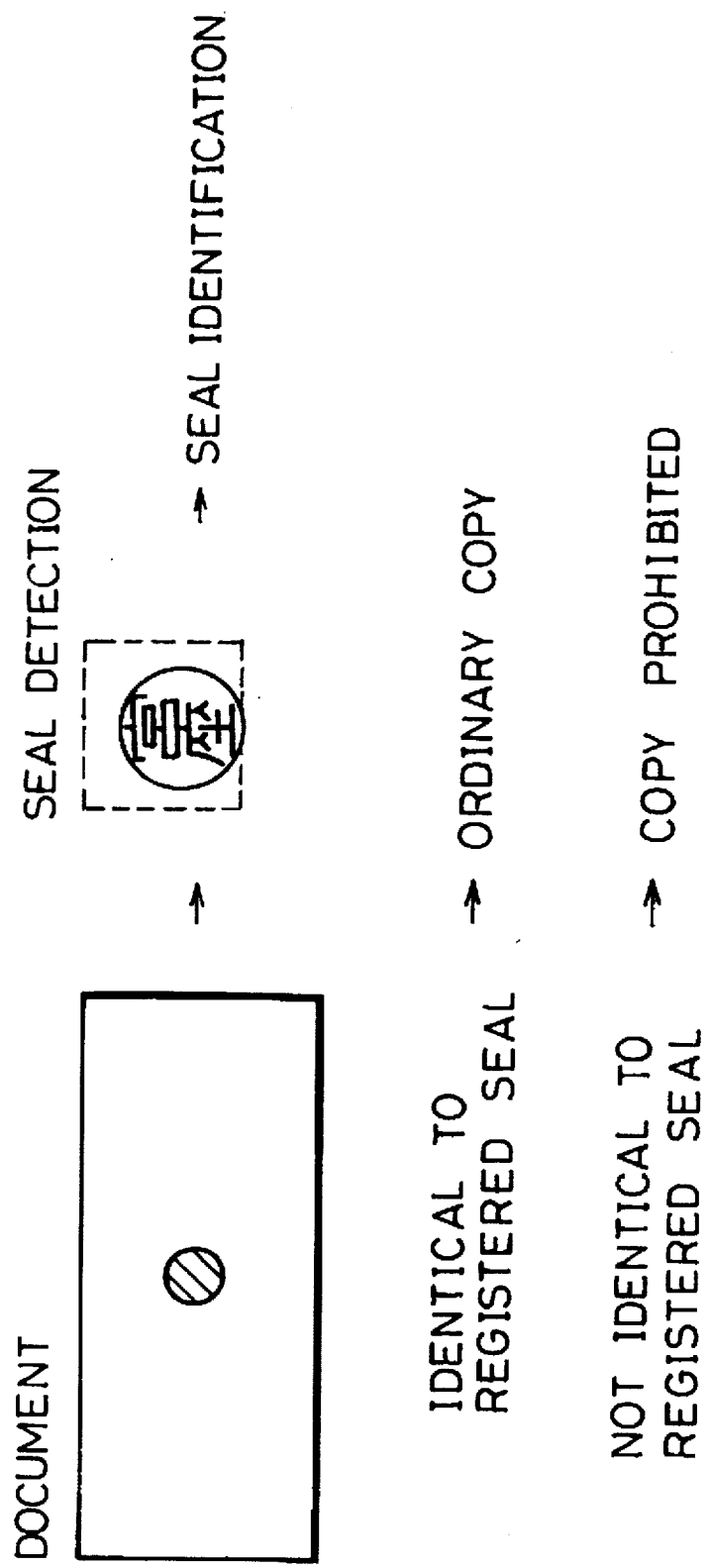
FIG. 23 is an explanatory drawing that shows an outline of the controlling operation shown in FIG. 22.

Next, if the seal is not a registered seal, a warning display is given on the liquid crystal display panel 50 in the operation panel 48, and the copying operation of the copying machine main body 26 is stopped (S57). Here, if the judgment is "NO" at S21 and S58, it is determined that the seal is neither a seal, nor a registered seal, and the copying operation is carried out (S9). FIG. 23 illustrates the above-mentioned controlling operation.

With this arrangement, a judgement is made as to whether or not the copy of a document is permissible based on only the recognition of its seal; this makes it possible to prevent unnecessary copying operations.

Moreover, it is possible to adopt another arrangement wherein: a seal is detected as a character in a document; a judgement is made as to whether or not the seal is one of the registered seals that are put on documents the copy of which is restricted in number; and if the seal is a registered one, the number of copies is restricted to a permissible number of copies that has been preliminarily determined.

Figure 24:
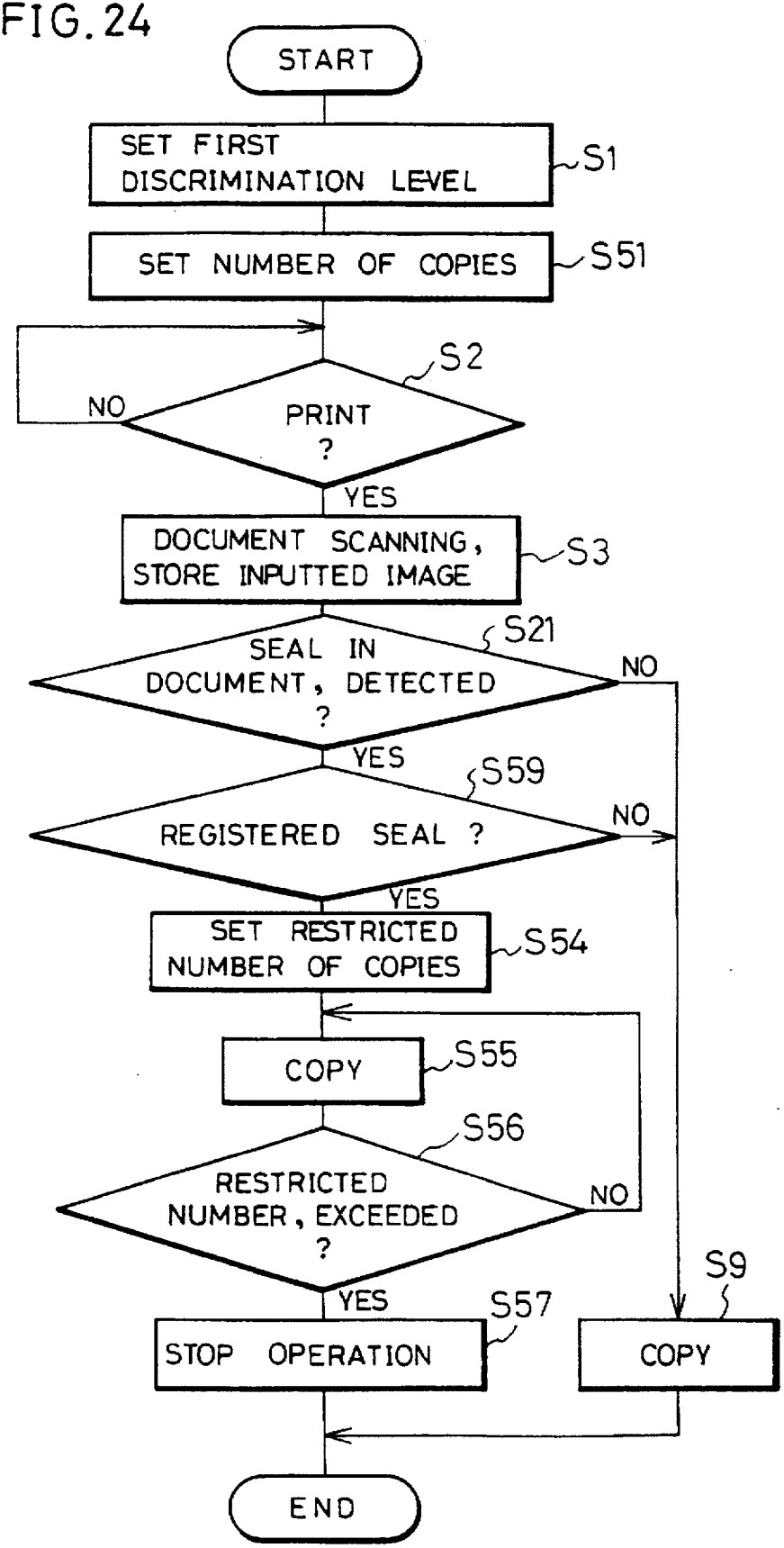
FIG. 24 is a flow chart showing a controlling operation that is carried out so as to restrict output copies to the permissible number of copies that is determined for each seal by detecting seals in the above-mentioned anti-counterfeiting device for use in the digital copying machine.

In this case, as shown in FIG. 24, after the first discrimination level has been set at S1, permissible numbers of copies are set in the seal-storing section 56 shown in FIG. 1 with respect to predetermined seals (S51). Thereafter, upon detection of a seal at S21 after the steps S2 and S3, a judgement is made as to whether or not this seal is one of the seals that have been preliminarily stored in the seal-storing section 56 based on the size and style of the seal (S59).

Figure 25:
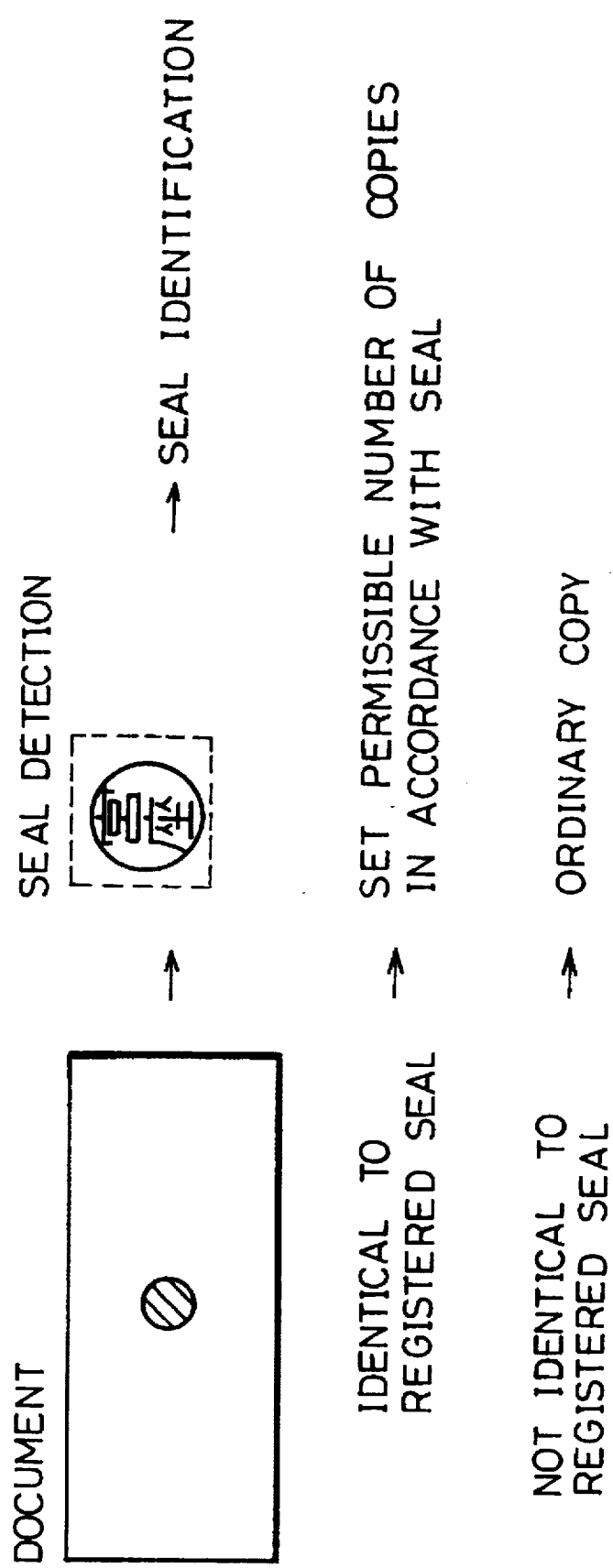
FIG. 25 is an explanatory drawing that shows an outline of the controlling operation shown in FIG. 24.

Successively, if the seal is one of the registered seals, the predetermined permissible number is read from the seal-storing section 56 (S54). Then, the copying operation is carried out under this restriction (S55), and is continued until the number of output copies reaches the restricted number of copies (S56). When the restricted number of copies is exceeded, a warning display is given on the liquid crystal display panel 50 in the operation panel 48, and the copying operation of the copying machine main body 26 is stopped (S57). FIG. 25 illustrates the above-mentioned controlling operation.

With this arrangement, a judgement is made as to the permissible number of copies for a document based on only the recognition of its seal; this makes it possible to prevent unnecessary copying operations.

Furthermore, it is possible to adopt another arrangement wherein: a seal is detected as a character in a document; a judgement is made as to whether or not the seal is red; and if the seal is red, the copying operation is carried out after converting its color to black.

Figure 26:
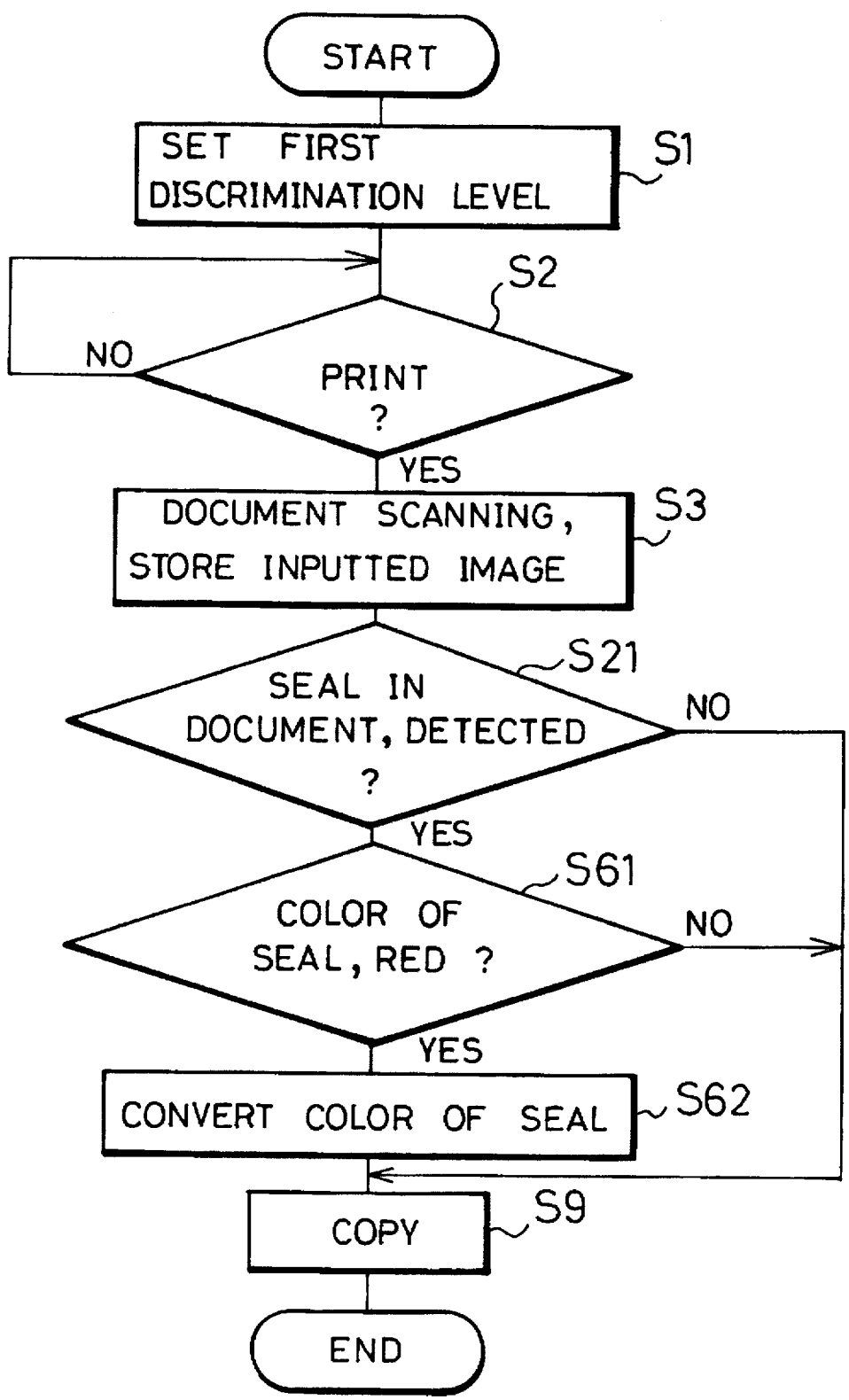
FIG. 26 is a flow chart showing a controlling operation that is carried out so that upon detection of a red seal, the output is made after converting its color to black, in the above-mentioned anti-counterfeiting device for use in the digital copying machine.
Figure 27:
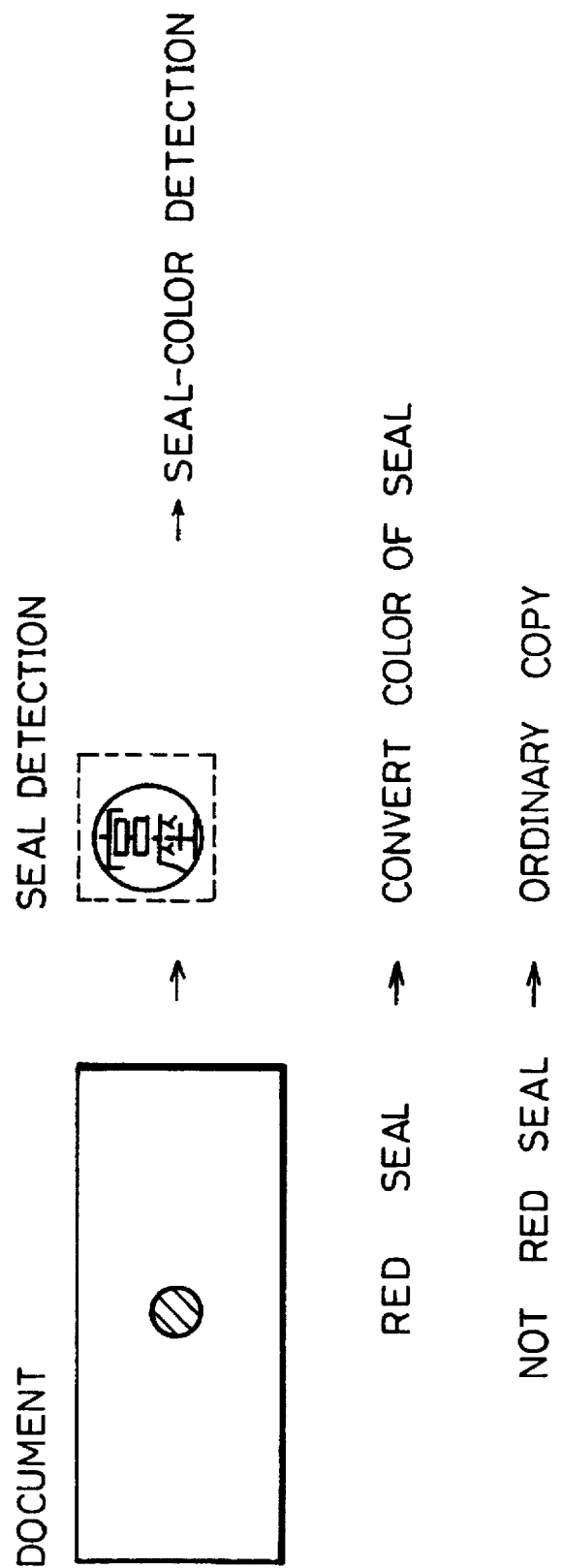
FIG. 27 is an explanatory drawing .that shows an outline of the controlling operation shown in FIG. 26.

In this case, as shown in FIG. 26, upon detection of a seal at S21, a judgement is made as to whether or not this seal is red (S61). Next, if the seal is red, the red color is converted into black (S62), and then the copying operation is carried out (S9). FIG. 27 illustrates the above-mentioned controlling operation.

This arrangement makes it possible to supply copies that raise no problems for ordinary use while preventing counterfeit problems, by merely using the recognition of the seal.

As described above, in the anti-counterfeiting device of the present invention for use in the digital copying machine, the character-detecting section 51, which is shown in FIG. 1 and functions as the seal detector, detects a seal from an inputted image that has been read from a document. Then, the output control section 57, which functions as the output restricter, conducts output restrictions in accordance with the detection of seal made by the character-detecting section 51 in such a manner that the number of output copies is restricted or the color conversion is made with respect to the output of image data.

Therefore, the judgement is made as to whether or not a document in question is one of the output-prohibited documents by using only seals; this makes it possible to simplify the judgement and reduce the burden in the discrimination, thereby reducing the judging time.

Moreover, since the output restrictions as to the number of output copies, the color conversion of output data, and other factors with respect to image data are conducted in accordance with the detection of seal made by the character-detection section 51, it is possible to reduce the possibility of losses due to counterfeit from the aspect of output restriction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An anti-counterfeiting device, which is installed in an image processing apparatus having reading means for reading an image from a document and output means for releasing an output image derived from the read image, comprising:

character-detecting means for detecting a character from the image that has been read from the document by the reading means;

discrimination-pattern storing means for storing specific images each of which is one portion of an image of paper money;

discrimination-pattern supplying means for generating discrimination patterns corresponding to a discrimination level from the specific images stored in the discrimination-pattern storing means;

judging means for making a judgement as to whether or not the document is paper money by comparing the detected character with the discrimination patterns;

discrimination-controlling means which first controls the judging means so that the judging means makes a judgement as to whether or not the document is paper money by using discrimination patterns at a predetermined level; if the judgement shows that the document is paper money, then controls the discrimination-pattern supplying means so that the discrimination-pattern supplying means supplies to the judging means discrimination patterns at a level higher than the level of said discrimination patterns; and controls the judging means so that the judging means makes a re-judgement so as to confirm whether or not the document is paper money by using the discrimination patterns at the higher level; and output control means which, if the judging means confirms that the document is paper money, controls the output means so as to stop the output of the output image.

2. The anti-counterfeiting device as defined claim 1, wherein the specific images stored in the discrimination-pattern storing means include images of face values of paper money.

3. The anti-counterfeiting device as defined in claim 2, wherein the discrimination-controlling means further comprises:

face-value discrimination means which controls the discrimination-pattern supplying means so that if the character detected by the character-detecting means is identical to a face value of paper money, it supplies the judging means with discrimination patterns at a higher level in accordance with the increment of the face value.

4. The anti-counterfeiting device as defined in claim 1, wherein the specific images stored in the discrimination-pattern storing means include images of unit symbols of face values in paper money.

5. The anti-counterfeiting device as defined in claim 1, wherein the specific images stored in the discrimination-pattern storing means include images of seals on paper money.

6. The anti-counterfeiting device as defined in claim 1, further comprising:

output-copy-number input means whereby an operator inputs the number of output copies to the output means; and output-copy-number discrimination means which controls the discrimination-pattern supplying means so that it supplies the judging means with discrimination patterns at a higher level in accordance with the increment of the number of output copies that has been inputted through the output-copy-number input means.

7. An anti-counterfeiting device, which is installed in an image processing apparatus having reading means for reading an image from a document and output means for releasing an output image derived from the read image, comprising:

seal-detecting means for detecting a seal from the image that has been read from the document by the reading means;

seal-storing means for preliminarily storing specific seals that are put or printed on specific documents;

discrimination-pattern supplying means for generating discrimination patterns in accordance with a discrimination level, the discrimination patterns being derived from the specific seals stored in the seal storing means;

judging means for making a judgement as to whether or not the document is one of the specific documents by comparing the seal detected by the seal-detecting means with the discrimination patterns derived from the specific seals;

discrimination-controlling means which first controls the discrimination-pattern supplying means so that it generates the outer shapes of the specific seals as discrimination patterns; allows the judging means to make a judgement as to whether or not the document is any of the specific documents; if the judgement shows that the document is one of the specific documents, then controls the discrimination-pattern supplying means so that the discrimination-pattern supplying means supplies discrimination patterns at a level higher than the level of said discrimination patterns; and controls the judging means so that the judging means makes a re-judgement so as to confirm whether or not the document is one of the specific documents by using the discrimination patterns at the higher level; and output control means which, if the judging means confirms that the document is one of the specific documents, controls the output means so as to stop the output of the output image.

8. An anti-counterfeiting device, which is installed in an image processing apparatus having reading means for reading an image from a document and output means for releasing an output image derived from the read image, comprising:

seal-detecting means for detecting a seal from the image that has been read from the document by the reading means;

seal-storing means for preliminarily storing specific seals that are put or printed on specific documents and maximum numbers of output copies that are defined for the respective specific seals;

output-copy-number counting means for counting the number of copies that have been outputted by the output means with respect to a document;

judging means for making a judgment as to whether or not the document is one of the specific documents by comparing the seal detected by the seal-detecting means with discrimination patterns derived from the specific seals;

discrimination-pattern supplying means for generating the discrimination patterns in accordance with a discrimination level and for supplying the judging means with the discrimination patterns, the discrimination patterns being derived from the specific seals stored in the seal storing means;

discrimination-controlling means which first controls the discrimination-pattern supplying means so that it generates the outer shapes of the specific seals as discrimination patterns; allows the judging means to make a judgement as to whether or not the document is any of the specific documents; if the judgement shows that the document is one of the specific documents, then controls the discrimination-pattern supplying means so that the discrimination-pattern supplying means supplies the judging means with discrimination patterns at a level higher than the level of said discrimination patterns; and controls the judging means so that the judging means makes a re-judgement so as to confirm whether or not the document is one of the specific documents by using the discrimination patterns at the higher level; and output control means which, if the judging means confirms that the document is one of the specific documents, controls the output means so that the output of the output image is stopped when the number of output copies that have been counted by the output-copy-number counting means has exceeded the maximum number of output copies that is defined for the specific seal on the document, in accordance with the maximum numbers of output copies stored in the seal-storing means.

9. An anti-counterfeiting method, which is used in an image processing apparatus having reading means for reading an image from a document, output means for releasing an output image derived from the read image, and specific-image storing means for preliminarily storing specific images each of which is one portion of an image of a specific document, comprising:

a first step of making a judgement as to whether or not the document is one of the specific documents by judging whether or not the image read by the reading means contains an image identical to one of the specific images stored in the specific-image storing means, by using a first reference of judgement;

a second step, operative when the document is judged as a specific document in the first step, of confirming whether or not the document is the specific document by making a comparison again between the portion judged to be identical to one of the specific images in the first step and the specific image by using a second reference of judgement that is a level higher than the first reference of judgement; and a third step of making the output means stop the output of the output image when the document has been confirmed to be the specific document in the second step.

10. The anti-counterfeiting method as defined in claim 9, wherein the judgement in the second step is conducted by making a comparison between the image read from the document and the specific document stored in the specific-image storing means by using image data wherein the density of each pixel constituting the image is represented by using finer gradations as the reference of judgement becomes higher.

11. The anti-counterfeiting method as defined in claim 9, wherein the judgement in the second step is conducted by dividing the image read from the document into finer blocks as the reference of judgement becomes higher and making a comparison block by block as to whether the image is identical to the specific image.

12. The anti-counterfeiting method as defined in claim 9, further comprising the step of:

setting as a second reference of judgement, when the image read from the document is judged to contain an image identical to a face value of paper money defined as one of the specific documents in the first step, a reference of judgement at a higher level in accordance with the increment of the face value, prior to the second step.

13. The anti-counterfeiting method as defined in claim 9, wherein the specific images in the first step include symbols that represent units of face values of paper money.

14. The anti-counterfeiting method as defined in claim 9, wherein the specific images in the first step include seals that are put or printed on the specific documents.

15. The anti-counterfeiting method as defined in claim 9, further comprising the step of:

setting as the second reference of judgement, operative when the number of output copies is set to a multiple number and the image read from the document is judged to contain an image identical to a face value of paper money in the first step, a reference of judgement at a higher level in accordance with the increment of the face value as well as the increment of the number of output copies, in relation to the face value and the number of output copies preliminarily set, prior to the second step.

16. An anti-counterfeiting device, which is installed in an image processing apparatus having reading means for reading an image from a document and output means for releasing an output image derived from the read image, comprising:

seal-storing means for preliminarily storing images of specific seals that are put or printed on specific documents;

seal-detecting means for detecting a seal from the image that has been read from the document by the reading means and for making a judgement as to the degree of importance of the seal based on the style of a character contained in the seal;

discrimination-pattern supplying means for generating discrimination patterns in accordance with a discrimination level, the discrimination patterns being derived from the images of the specific seals stored in the seal storing means;

judging means for making a judgement as to whether or not the document is one of the specific documents by comparing the seal with the discrimination patterns;

discrimination-controlling means which, if a seal is detected by the seal-detecting means, first controls the discrimination-pattern supplying means so that it generates discrimination patterns that are suitable for the degree of importance of the seal, and controls the judging means so that the judging means makes a judgement as to whether or not the document is one of the Specific documents by comparing the seal with the discrimination patterns; and output control means which, if the judging means confirms that the document is one of the specific documents, controls the output means so that the output of the output image is stopped.

17. The anti-counterfeiting device as defined in claim 7, further comprising:

permissible seal storage means for preliminarily storing images of output-permissible seals that are defined as seals put or printed on output-permissible documents;

seal-judging means for making a judgement as to whether or not the seal detected by the seal-detecting means is identical to any of the output permissible seals; and output-operation control means which, if the result of the judgement made by the seal-judging means shows that the seal detected from the document is not included in the output-permissible seals, prohibits the output operation of the output means and, if the seal detected from the document is one of the output-permissible seals, allows the output operation of the output means.

18. An anti-counterfeiting device, which is installed in an image processing apparatus having reading means for reading an image from a document and output means for releasing an output image derived from the read image, comprising:

seal-detecting means for detecting a seal from the image that has been read from the document by the reading means;

seal-storing means for preliminarily storing specific seals that are put or printed on specific documents;

discrimination-pattern supplying means for generating discrimination patterns in accordance with a discrimination level, the discrimination patterns being derived from the specific seals stored in the seal storing means;

judging means for making a judgement as to whether or not the document is one of the specific documents by comparing the seal detected by the seal-detecting means with the discrimination patterns derived from the specific seals;

discrimination-controlling means which first controls the discrimination-pattern supplying means so that it generates the outer shapes of the specific seals as discrimination patterns; allows the judging means to make a judgement as to whether or not the document is any of the specific documents; if the judgement shows that the document is one of the specific documents, then controls the discrimination-pattern supplying means so that the discrimination-pattern supplying means supplies discrimination patterns at a level higher than the level of said discrimination patterns; and controls the judging means so that the judging means makes a re-judgement so as to confirm whether or not the document is one of the specific documents by using the discrimination-patterns at the higher level; and output control means which, if the judging means confirms that the document is one of the specific documents, controls the output means so that only the specific seal portion detected by the seal-detecting means is outputted in a color different from that of the document.

19. An anti-counterfeiting device, which is installed in an image processing apparatus having a reader for reading an image from a document and an output unit for releasing an output image derived from the read image, comprising:

seal-storing means for preliminarily storing images of specific seals that are put or printed on specific documents;

seal-detecting means for detecting a seal from the image that has been read from the document by the reader and for making a judgement as to the degree of importance of the seal based on the style of a character contained in the seal;

discrimination-pattern supplying means for generating discrimination patterns in accordance with a discrimination level, the discrimination patterns being derived from the images of the specific seals stored in said seal storing means;

judging means for making a judgement as to whether or not the document is one of the specific documents by comparing the seal with the discrimination patterns;

discrimination-controlling means, responsive to said seal-detecting means detecting a seal, for controlling said discrimination-pattern supplying means to generate discrimination patterns that are suitable for the degree of importance of the seal and for controlling said judging means to make a judgement as to whether or not the document is one of the specific documents by comparing the seal with the discrimination patterns; and output control means, responsive to said judging means confirming that the document is one of the specific documents, for controlling the output unit so that only the seal portion that has been detected by said seal-detecting means is changed to a color other than the color used in the document and outputted.

* * * * *